(12) United States Patent
Kim et al.

(10) Patent No.: US 12,160,731 B2
(45) Date of Patent: Dec. 3, 2024

(54) METHOD AND APPARATUS FOR SUPPORTING UP SECURITY FOR MO-EDT IN CU-DU SPLIT IN A WIRELESS COMMUNICATION SYSTEM

(71) Applicant: LG ELECTRONICS INC., Seoul (KR)

(72) Inventors: Seokjung Kim, Seoul (KR); Jian Xu, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 204 days.

(21) Appl. No.: 17/622,034

(22) PCT Filed: Mar. 19, 2020

(86) PCT No.: PCT/KR2020/003570
§ 371 (c)(1),
(2) Date: Dec. 22, 2021

(87) PCT Pub. No.: WO2021/045339
PCT Pub. Date: Mar. 11, 2021

(65) Prior Publication Data
US 2022/0279345 A1 Sep. 1, 2022

(30) Foreign Application Priority Data
Sep. 6, 2019 (KR) .................. 10-2019-0111004

(51) Int. Cl.
*H04W 12/33* (2021.01)
*H04W 12/033* (2021.01)
(Continued)

(52) U.S. Cl.
CPC ....... *H04W 12/033* (2021.01); *H04W 12/106* (2021.01); *H04W 76/10* (2018.02); *H04W 88/085* (2013.01)

(58) Field of Classification Search
CPC . H04W 12/033; H04W 12/106; H04W 76/10; H04W 88/085; H04W 92/12
See application file for complete search history.

(56) References Cited

U.S. PATENT DOCUMENTS

2020/0245135 A1* 7/2020 Phuyal ................ H04W 12/106
2022/0110009 A1* 4/2022 Liu ....................... H04W 48/12

FOREIGN PATENT DOCUMENTS

WO       2018/004278 A1      1/2018
WO       WO-2020226546 A1 * 11/2020

OTHER PUBLICATIONS

Huawei, "Discussion on RAN3 impacts of UP Integrity Protection for Small Data in Early Data Transfer", R3-190618, 3GPP TSG RAN WG3 #103, Athens, Greece, Feb. 15, 2019, Section 2.
(Continued)

*Primary Examiner* — Brian F Shaw
(74) *Attorney, Agent, or Firm* — BRYAN CAVE LEIGHTON PAISNER LLP

(57) ABSTRACT

A method and apparatus supporting UP security for MO-EDT in CU-DU split in a wireless communication system. A central unit (CU) receives, from a distributed unit (DU), a first message including a PDCP Data PDU, wherein the PDCP Data PDU is configured by a wireless device. A CU calculates a $HASH_{DATA}$ from the PDCP Data PDU. A CU verifies a Short MAC-I of the wireless device based on the $HASH_{DATA}$. A CU transmits, to the DU, a second message to setup a UE context for the wireless device in the DU based on the verification.

13 Claims, 19 Drawing Sheets

(51) Int. Cl.
    *H04W 12/106*    (2021.01)
    *H04W 76/10*    (2018.01)
    *H04W 88/08*    (2009.01)

(56) References Cited

OTHER PUBLICATIONS

NTT Docomo, Inc., "High Level Overview of Functions for LTE Higher Layer Split", R3-186613, 3GPP TSG RAN WG3 RAN3#102, Spokane, WA, USA, Nov. 2, 2018, Section 2.3.3; and Figure 1.

Huawei et al., "Discussion on W1AP RRC Message Transfer Procedures", R3-190616, 3GPP TSG RAN WG3 Meeting #103, Athens, Greece, Feb. 15, 2019, Section 2.

Huawei et al., "Discussion on W1AP UE Context Management procedures", R3-190613, 3GPP TSG RAN WG3 Meeting #103, Athens, Greece, Feb. 15, 2019, Section 2.

3rd Generation Partnership Project;Technical Specification Group Services and System Aspects; 3GPP System Architecture Evolution (SAE);Security Architecture,(Release 15), pp. 1-163.

3rd Generation Partnership Project;Technical Specification Group Services and System Aspects;Security architecture and procedures for 5G system (Release 15), 3GPP TS 33.501 V15.5.0, Jun. 2019, pp. 1-190.

"3rd Generation Partnership Project;Technical Specification Group Radio Access Network; NG-RAN; Architecture Description", (Release 15),3GPP TS 38.401 V15.4.0, Dec. 2018, pp. 1-40.

"3rd Generation Partnership Project;Technical Specification Group Radio Access Network;NG-RAN; F1 General Aspects and Principles" (Release 15),3GPP TS 38.470 V15.4.0, Dec. 2018, pp. 1-13.

\* cited by examiner

METHOD AND APPARATUS FOR SUPPORTING UP SECURITY FOR MO-EDT IN CU-DU SPLIT IN A WIRELESS COMMUNICATION SYSTEM

CROSS-REFERENCE TO RELATED APPLICATIONS

This application is the National Stage filing under 35 U.S.C. § 371 of International Application No. PCT/KR2020/003570, filed on Mar. 19, 2020, and claims priority to and the benefit of Korean Application No. 10-2019-0111004, filed on Sep. 6, 2019, all of which are incorporated by reference in their entirety herein.

TECHNICAL FIELD

The present disclosure relates to a method and apparatus for supporting UP security for MO-EDT in CU-DU split in a wireless communication system.

RELATED ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in an international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Radio resource control (RRC) inactive state (or RRC idle state with suspend) is a new state added in 5G NR compare to 4G LTE. Motivation to use this state seems to reduce the time to bring user equipment (UE) in connected state from other states. This will increase UE battery life and latency as well because of less signaling involved. Both UE and gNB stores access stratum (AS) context in this state and bringing to RRC connected state from inactive state would not involve NAS level signaling.

In Rel-13, narrowband internet-of-things (NB-IoT) and LTE for machine-type communication (LTE-M) were standardized to provide wide-area connectivity for IoT. The technologies in Rel-14 evolved beyond the basic functionality specified in Rel-13. In Rel-15, to optimize the support for infrequent small data packet transmissions, a mechanism for data transmission during the random access procedure is specified for NB-IoT and LTE-M. This mechanism may be referred to as early data transmission (EDT) and can improve the device battery life and reduces the message latency.

SUMMARY

The EDT UP integrity protection mechanism is introduced to protect the UP data transmitted during the resume procedure, for example, HASH of uplink PDCP Data PDU. The UE may calculate $HASH_{DATA}$ with uplink PDCP Data PDU. The UE may calculate shortResumeMAC-I with source C-RNTI, source PCI, resume constant, target Cell-ID, and $HASH_{DATA}$. The target eNB may calculate $HASH_{DATA}$ with uplink PDCP Data PDU received from the UE, and may include the $HASH_{DATA}$ in the X2AP RETRIEVE UE CONTEXT REQUEST message to the source eNB. The source eNB may verify the ShortResumeMAC-I with the source C_RNTI, source PCI, resume constant, target Cell-ID and $HASH_{DATA}$.

However, it does not consider the CU-DU split in the eNB or gNB. Basically, the function on calculation of the $HASH_{DATA}$ may be hosted in the eNB-CU or gNB-CU(-CP). In order to calculate the $HASH_{DATA}$ at the eNB-CU or gNB-CU(-CP), the uplink PDCP Data PDU may be needed as a input. Although the eNB-DU or gNB-DU receives the uplink PDCP Data PDU, there may be no W1/F1 connection between the DU and the CU. To setup the W1/F1 connection, the eNB-CU or gNB-CU(-CP) may restore the UE context and re-establish the AS security. Since there is still no $HASH_{DATA}$ in the eNB-CU or gNB-CU(-CP), it is difficult to verify the UE identity and restore the UE context.

Therefore, studies for supporting UP security for MO-EDT in CU-DU split in a wireless communication system are needed. In particular, studies for considers how to calculate the $HASH_{DATA}$ in CU-DU split are needed.

In an aspect, a method performed by a central unit (CU) in a wireless communication system is provided. A CU receives, from a distributed unit (DU), a first message including a PDCP Data PDU, wherein the PDCP Data PDU is configured by a wireless device. A CU calculates a $HASH_{DATA}$ from the PDCP Data PDU. A CU verifies a Short MAC-I of the wireless device based on the $HASH_{DATA}$. A CU transmits, to the DU, a second message to setup a UE context for the wireless device in the DU based on the verification.

In another aspect, a method performed by a central unit (CU)-control plane (CP) in a wireless communication system is provided. A CU-CP receives, from a distributed unit (DU), a first message including a PDCP Data PDU, wherein the PDCP Data PDU is configured by a wireless device. A CU-CP calculates a $HASH_{DATA}$ from the PDCP Data PDU. A CU-CP verifies a Short MAC-I of the wireless device based on the $HASH_{DATA}$. A CU-CP transmits, to the CU-user plane (UP), a second message including the PDCP Data PDU.

The present disclosure may have various advantageous effects.

According to some embodiments of the present disclosure, an apparatus and method for supporting UP security for MO-EDT in CU-DU split in a wireless communication system are provided.

According to some embodiments of the present disclosure, $HASH_{DATA}$ could be calculated by each node (for example, DU, CU-CP, or CU-UP).

For example, by calculating the $HASH_{DATA}$ in eNB-DU or gNB-DU, additional W1/F1 signalling could be avoided.

The DU (for example, eNB-DU or gNB-DU) may host the function for calculating the $HASH_{DATA}$.

For example, by calculating the $HASH_{DATA}$ in eNB-CU or gNB-CU(-CP), the function for calculating the $HASH_{DATA}$ could be handled by the eNB-CU or gNB-CU(-CP). It is needed for the eNB-DU or gNB-DU to forward the PDCP Data PDU of the UE to eNB-CU or gNB-CU(-CP) before W1/F1 UE Context Setup procedure.

For example, by calculating the $HASH_{DATA}$ in eNB-CU or gNB-CU, the function for calculating the $HASH_{DATA}$ could be handled by the eNB-CU or gNB-CU. In order to forward the PDCP Data PDU of the UE to eNB-CU or gNB-CU(-UP), the eNB-CU or gNB-CU(-CP) may request to the eNB-DU or gNB-DU to setup of the UE context without UE verification.

In addition, it is possible to deliver a single DL data without state transition to RRC_CONNECTED in CU-DU split case.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION

DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Figure 1:
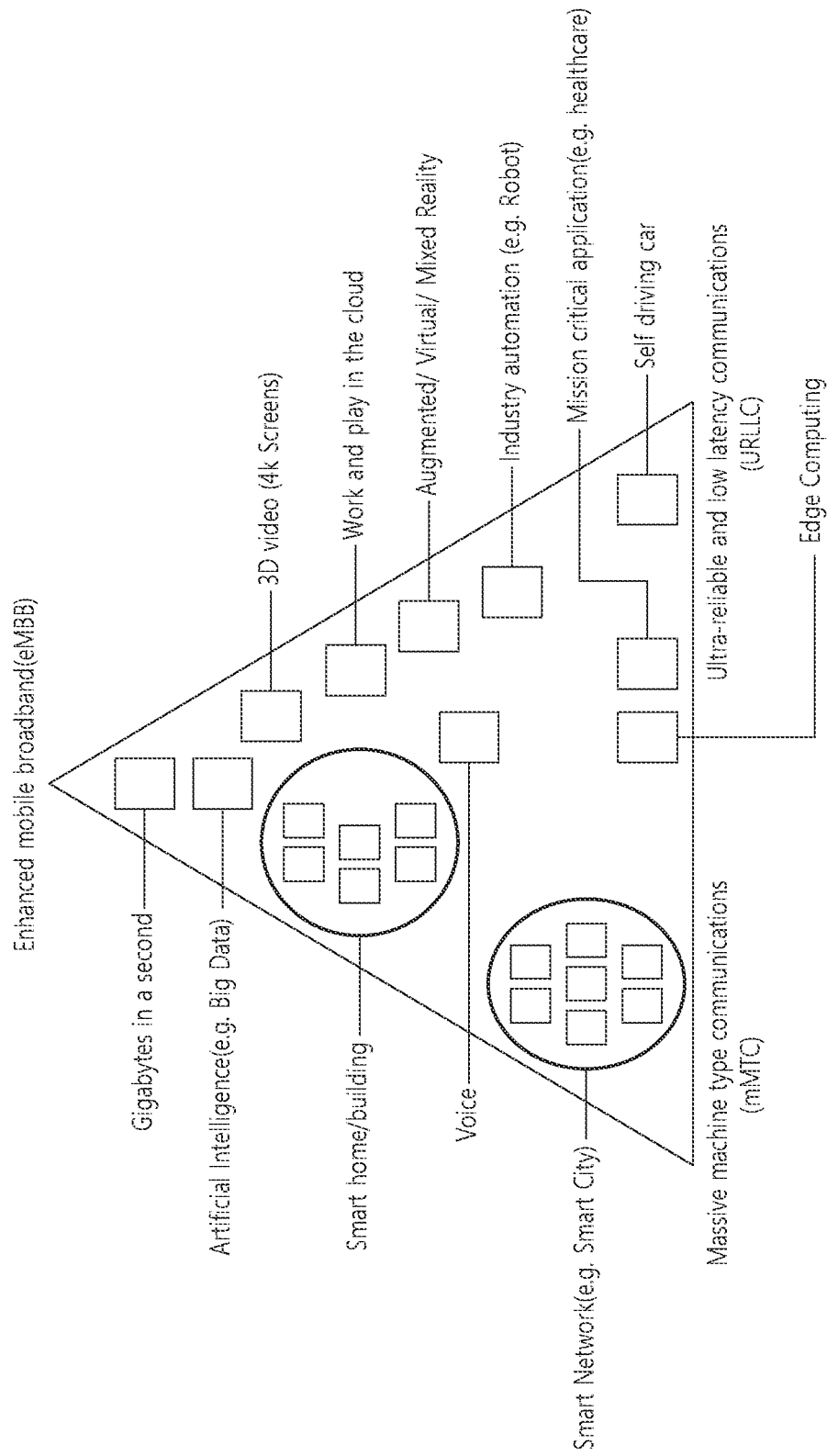
FIG. 1 shows examples of 5G usage scenarios to which the technical features of the present disclosure can be applied.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture, and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 2:
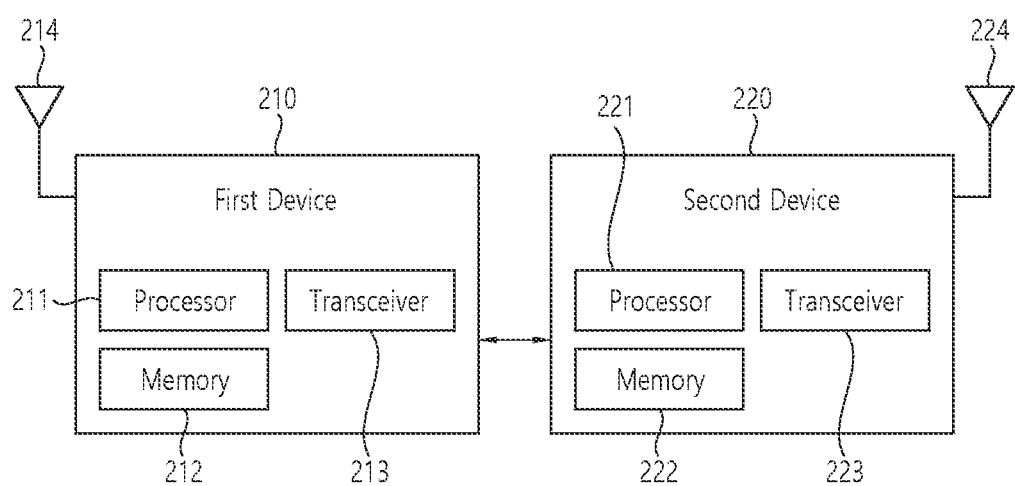
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220. The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
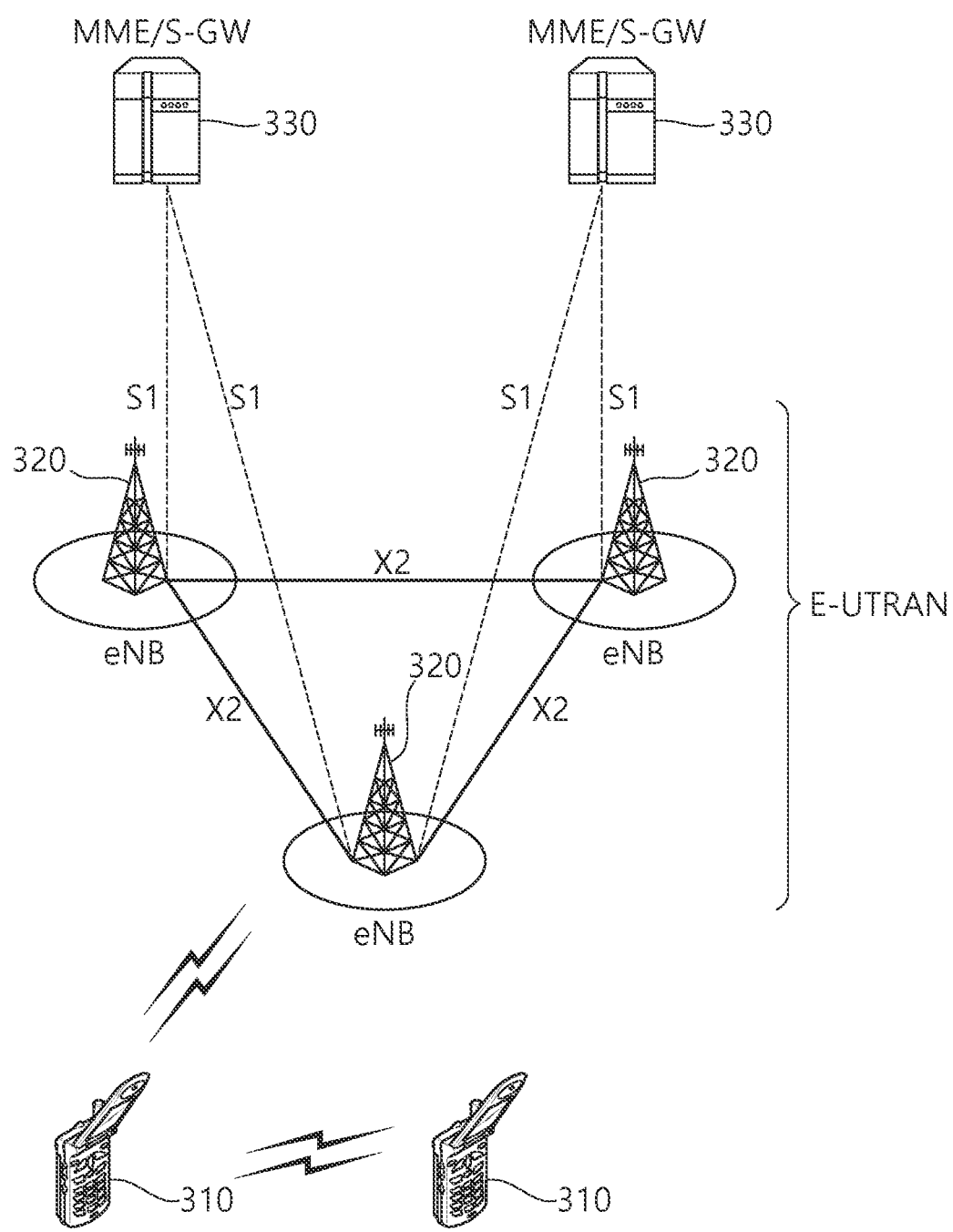
FIG. 3 shows another example of a wireless communication system to which the technical features of the present disclosure can be applied.

FIG. 3 shows another example of a wireless communication system to which the technical features of the present disclosure can be applied. Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), and a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
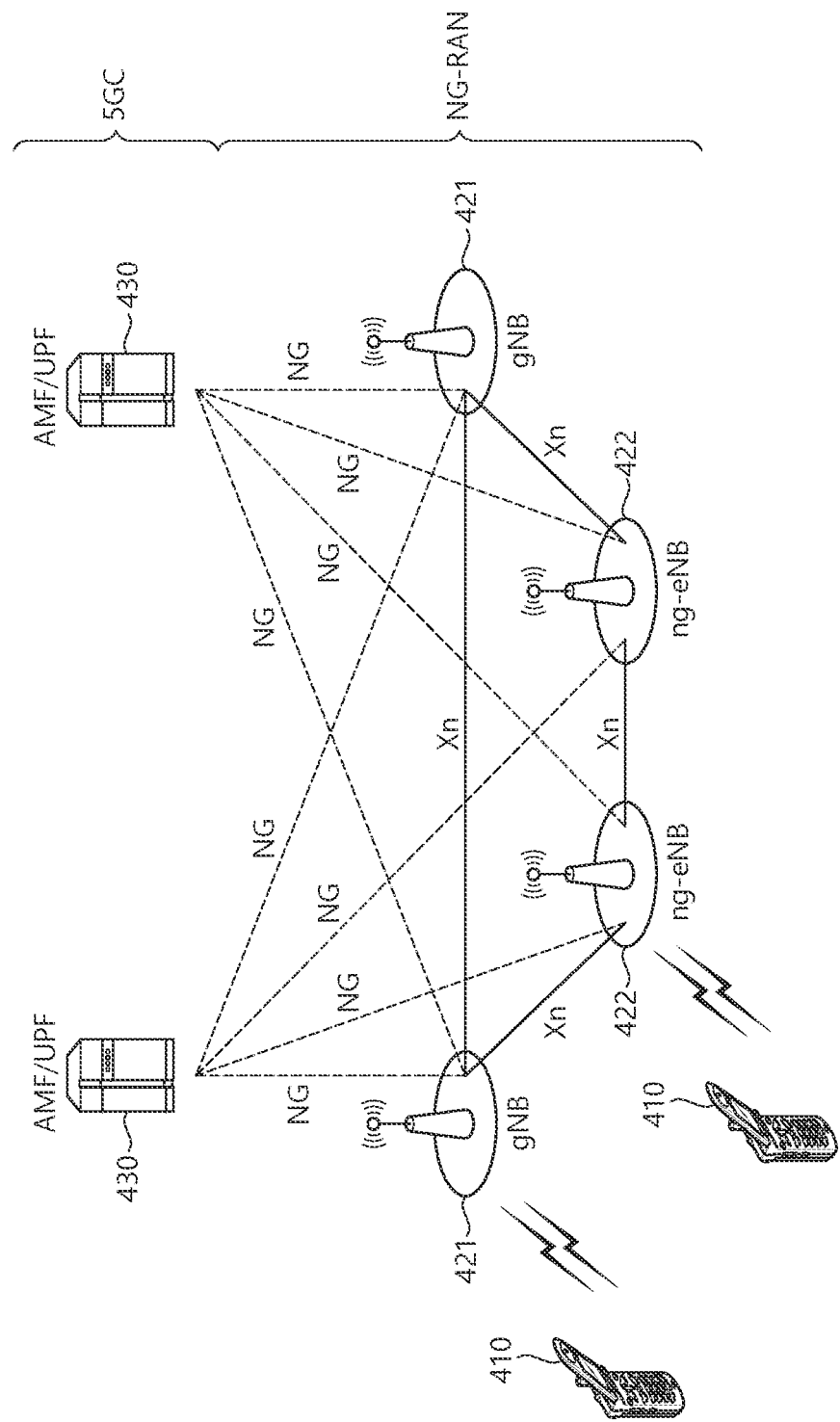
FIG. 4 shows another example of a wireless communication system to which the technical features of the present disclosure can be applied.

FIG. 4 shows another example of a wireless communication system to which the technical features of the present disclosure can be applied. Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional 5-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
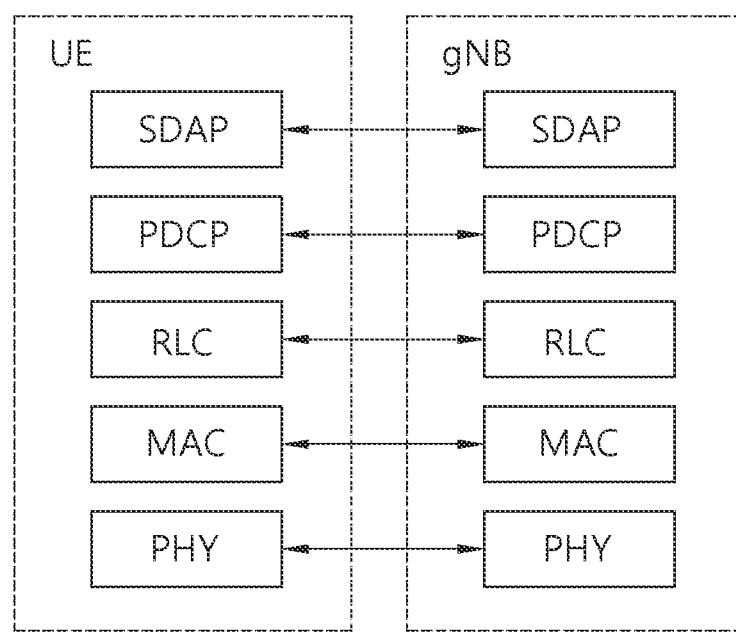
FIG. 5 shows a block diagram of a user plane protocol stack to which the technical features of the present disclosure can be applied.
Figure 6:
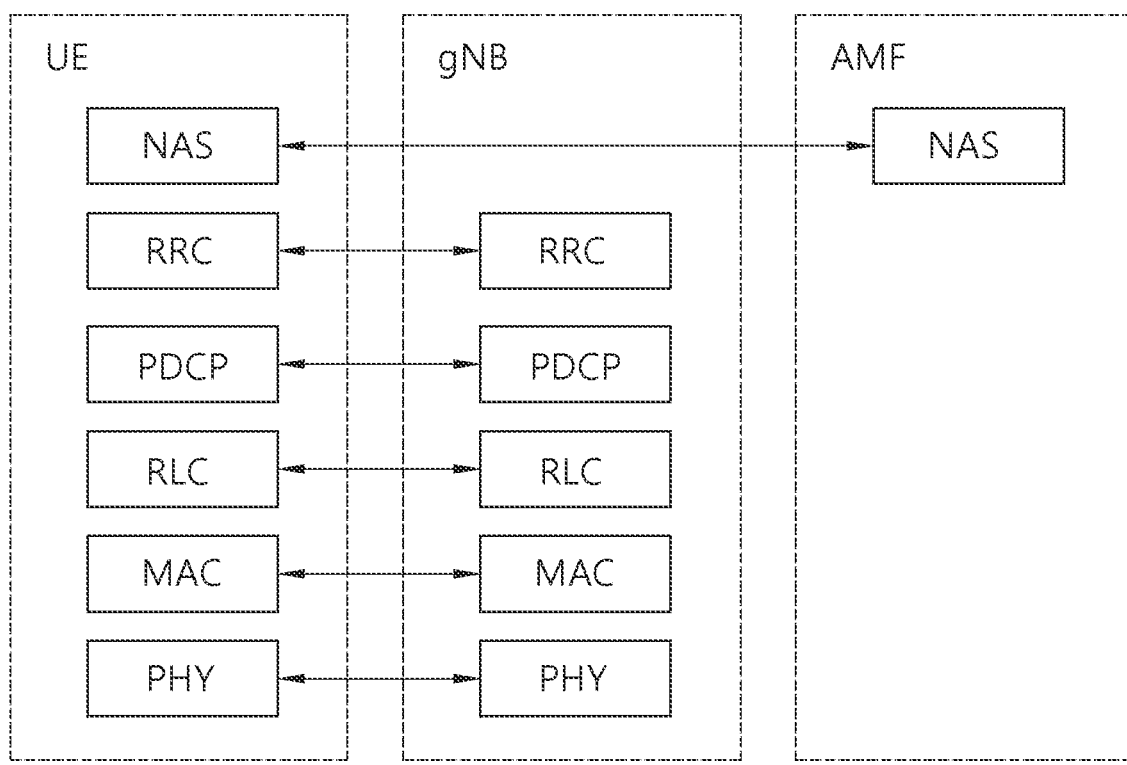
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied. The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Split of gNB central unit (gNB-CU) and gNB distributed unit (gNB-DU) is described. Section 6 of 3GPP TS 38.401 V15.4.0 (2018-12) and Sections 5.2 and 7.1 of 3GPP TS 38.470 V15.4.0 (2018-12) may be referred.

Figure 7:
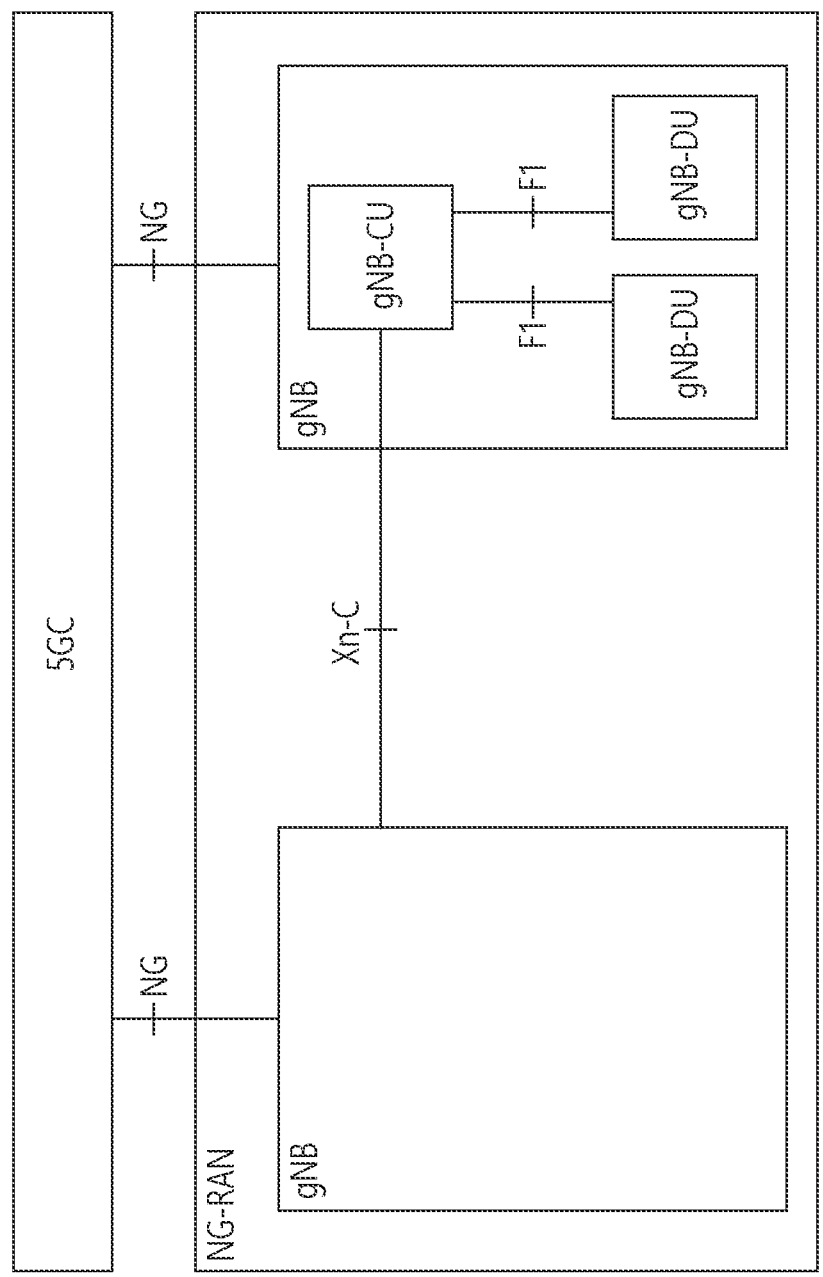
FIG. 7 shows an example of the overall architecture of an NG-RAN to which technical features of the present disclosure can be applied.

FIG. 7 shows an example of the overall architecture of an NG-RAN to which technical features of the present disclosure can be applied.

Referring to FIG. 7, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

Functions of the F1 interface includes F1 control (F1-C) functions as follows.

(1) F1 interface management function

The error indication function is used by the gNB-DU or gNB-CU to indicate to the gNB-CU or gNB-DU that an error has occurred.

The reset function is used to initialize the peer entity after node setup and after a failure event occurred. This procedure can be used by both the gNB-DU and the gNB-CU.

The F1 setup function allows to exchange application level data needed for the gNB-DU and gNB-CU to interoperate correctly on the F1 interface. The F1 setup is initiated by the gNB-DU.

The gNB-CU configuration update and gNB-DU configuration update functions allow to update application level configuration data needed between gNB-CU and gNB-DU to interoperate correctly over the F1 interface, and may activate or deactivate cells.

The F1 setup and gNB-DU configuration update functions allow to inform the single network slice selection assistance information (S-NSSAI) supported by the gNB-DU.

The F1 resource coordination function is used to transfer information about frequency resource sharing between gNB-CU and gNB-DU.

(2) System Information management function

Scheduling of system broadcast information is carried out in the gNB-DU. The gNB-DU is responsible for transmitting the system information according to the scheduling parameters available.

The gNB-DU is responsible for the encoding of NR master information block (MIB). In case broadcast of system information block type-1 (SIB1) and other SI messages is needed, the gNB-DU is responsible for the encoding of SIB1 and the gNB-CU is responsible for the encoding of other SI messages.

(3) F1 UE context management function

The F1 UE context management function supports the establishment and modification of the necessary overall UE context.

The establishment of the F1 UE context is initiated by the gNB-CU and accepted or rejected by the gNB-DU based on admission control criteria (e.g., resource not available).

The modification of the F1 UE context can be initiated by either gNB-CU or gNB-DU. The receiving node can accept or reject the modification. The F1 UE context management function also supports the release of the context previously established in the gNB-DU. The release of the context is triggered by the gNB-CU either directly or following a request received from the gNB-DU. The gNB-CU request the gNB-DU to release the UE Context when the UE enters RRC_IDLE or RRC_INACTIVE.

This function can be also used to manage DRBs and SRBs, i.e., establishing, modifying and releasing DRB and SRB resources. The establishment and modification of DRB resources are triggered by the gNB-CU and accepted/rejected by the gNB-DU based on resource reservation information and QoS information to be provided to the gNB-DU. For each DRB to be setup or modified, the S-NSSAI may be provided by gNB-CU to the gNB-DU in the UE context setup procedure and the UE context modification procedure.

The mapping between QoS flows and radio bearers is performed by gNB-CU and the granularity of bearer related management over F1 is radio bearer level. For NG-RAN, the gNB-CU provides an aggregated DRB QoS profile and QoS flow profile to the gNB-DU, and the gNB-DU either accepts the request or rejects it with appropriate cause value. To support packet duplication for intra-gNB-DU carrier aggregation (CA), one data radio bearer should be configured with two GPRS tunneling protocol (GTP)-U tunnels between gNB-CU and a gNB-DU.

With this function, gNB-CU requests the gNB-DU to setup or change of the special cell (SpCell) for the UE, and the gNB-DU either accepts or rejects the request with appropriate cause value.

With this function, the gNB-CU requests the setup of the secondary cell(s) (SCell(s)) at the gNB-DU side, and the gNB-DU accepts all, some or none of the SCell(s) and replies to the gNB-CU. The gNB-CU requests the removal of the SCell(s) for the UE.

(4) RRC message transfer function

This function allows to transfer RRC messages between gNB-CU and gNB-DU. RRC messages are transferred over F1-C. The gNB-CU is responsible for the encoding of the dedicated RRC message with assistance information provided by gNB-DU.

(5) Paging function

The gNB-DU is responsible for transmitting the paging information according to the scheduling parameters provided.

The gNB-CU provides paging information to enable the gNB-DU to calculate the exact paging occasion (PO) and paging frame (PF). The gNB-CU determines the paging assignment (PA). The gNB-DU consolidates all the paging records for a particular PO, PF and PA, and encodes the final RRC message and broadcasts the paging message on the respective PO, PF in the PA.

(6) Warning messages information transfer function

This function allows to cooperate with the warning message transmission procedures over NG interface. The gNB-CU is responsible for encoding the warning related SI message and sending it together with other warning related information for the gNB-DU to broadcast over the radio interface.

Figure 8:
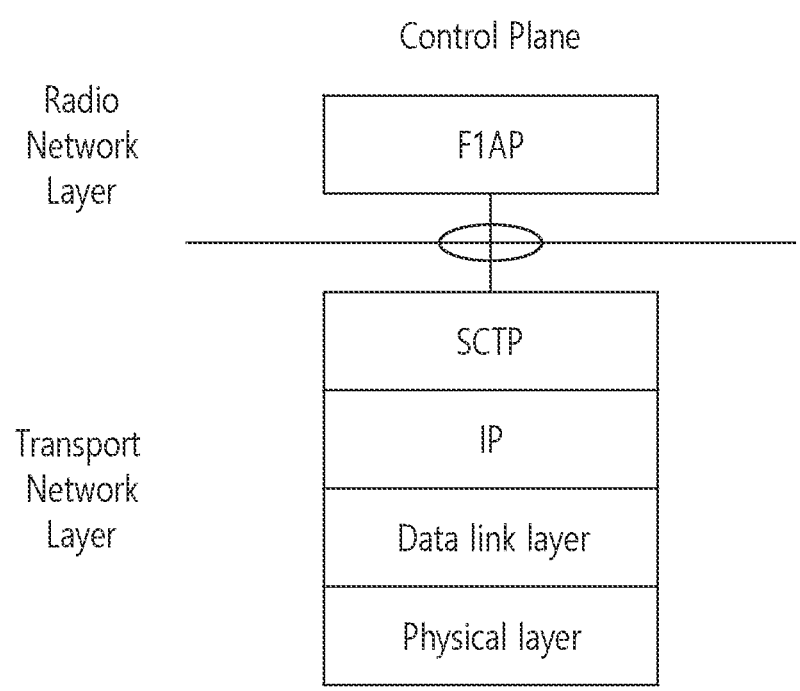
FIG. 8 shows an interface protocol structure for F1-C to which technical features of the present disclosure can be applied.

FIG. 8 shows an interface protocol structure for F1-C to which technical features of the present disclosure can be applied.

A transport network layer (TNL) is based on Internet protocol (IP) transport, comprising a stream control transmission protocol (SCTP) layer on top of the IP layer. An application layer signaling protocol is referred to as an F1 application protocol (E1AP).

Figure 9:
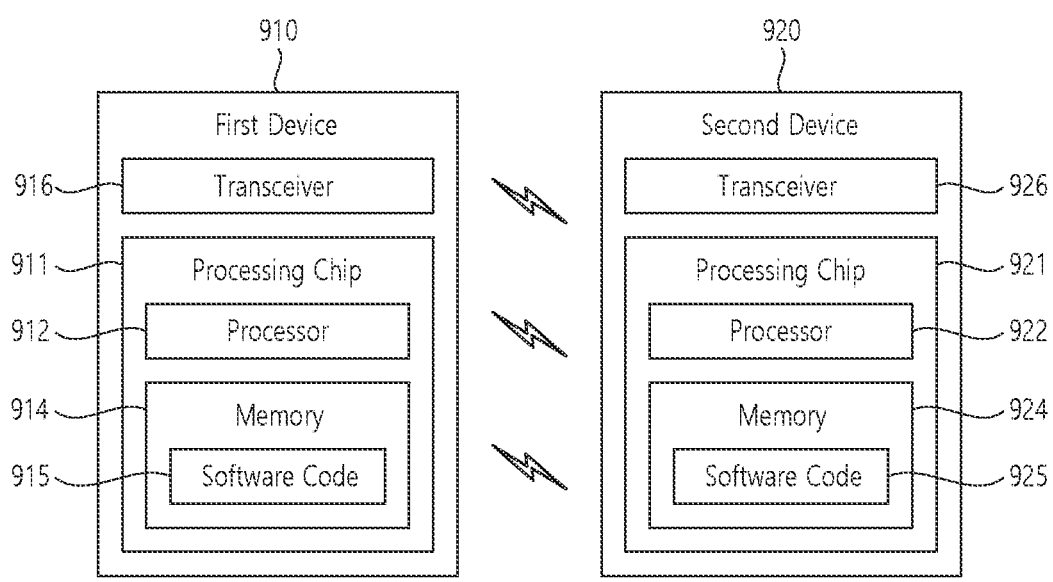
FIG. 9 shows another example of a wireless communication system to which the technical features of the present disclosure can be applied.

FIG. 9 shows another example of a wireless communication system to which the technical features of the present disclosure can be applied.

Referring to FIG. 9, the wireless communication system may include a first device 910 and a second device 920.

The first device 910 may include at least one transceiver, such as a transceiver 911, and at least one processing chip, such as a processing chip 912. The processing chip 912 may include at least one processor, such a processor 913, and at least one memory, such as a memory 914. The memory may be operably connectable to the processor 913. The memory 914 may store various types of information and/or instructions. The memory 914 may store a software code 915 which implements instructions that, when executed by the processor 913, perform operations of the present disclosure described below. For example, the software code 915 may implement instructions that, when executed by the processor 913, perform the functions, procedures, and/or methods of the present disclosure described below. For example, the software code 915 may control the processor 913 to perform one or more protocols. For example, the software code 915 may control the processor 913 may perform one or more layers of the radio interface protocol.

The second device 920 may include at least one transceiver, such as a transceiver 921, and at least one processing chip, such as a processing chip 922. The processing chip 922 may include at least one processor, such a processor 923, and at least one memory, such as a memory 924. The memory may be operably connectable to the processor 923. The memory 924 may store various types of information and/or instructions. The memory 924 may store a software code 925 which implements instructions that, when executed by the processor 923, perform operations of the present disclosure described below. For example, the software code 925 may implement instructions that, when executed by the processor 923, perform the functions, procedures, and/or methods of the present disclosure described below. For example, the software code 925 may control the processor 923 to perform one or more protocols. For example, the software code 925 may control the processor 923 may perform one or more layers of the radio interface protocol.

According to some embodiment of the present disclosure, the technical features of the present disclosure could be embodied directly in hardware, in a software executed by a processor, or in a combination of the two. For example, a method performed by a first core network node in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium. Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium. For example, computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to carry or store instructions or data structures. Computer-readable media may also include combinations of the above. In addition, the method described herein may be realized at least in part by a computer-readable communication medium that carries or communicates code in the form of instructions or data structures and that can be accessed, read, and/or executed by a computer.

Figure 10:
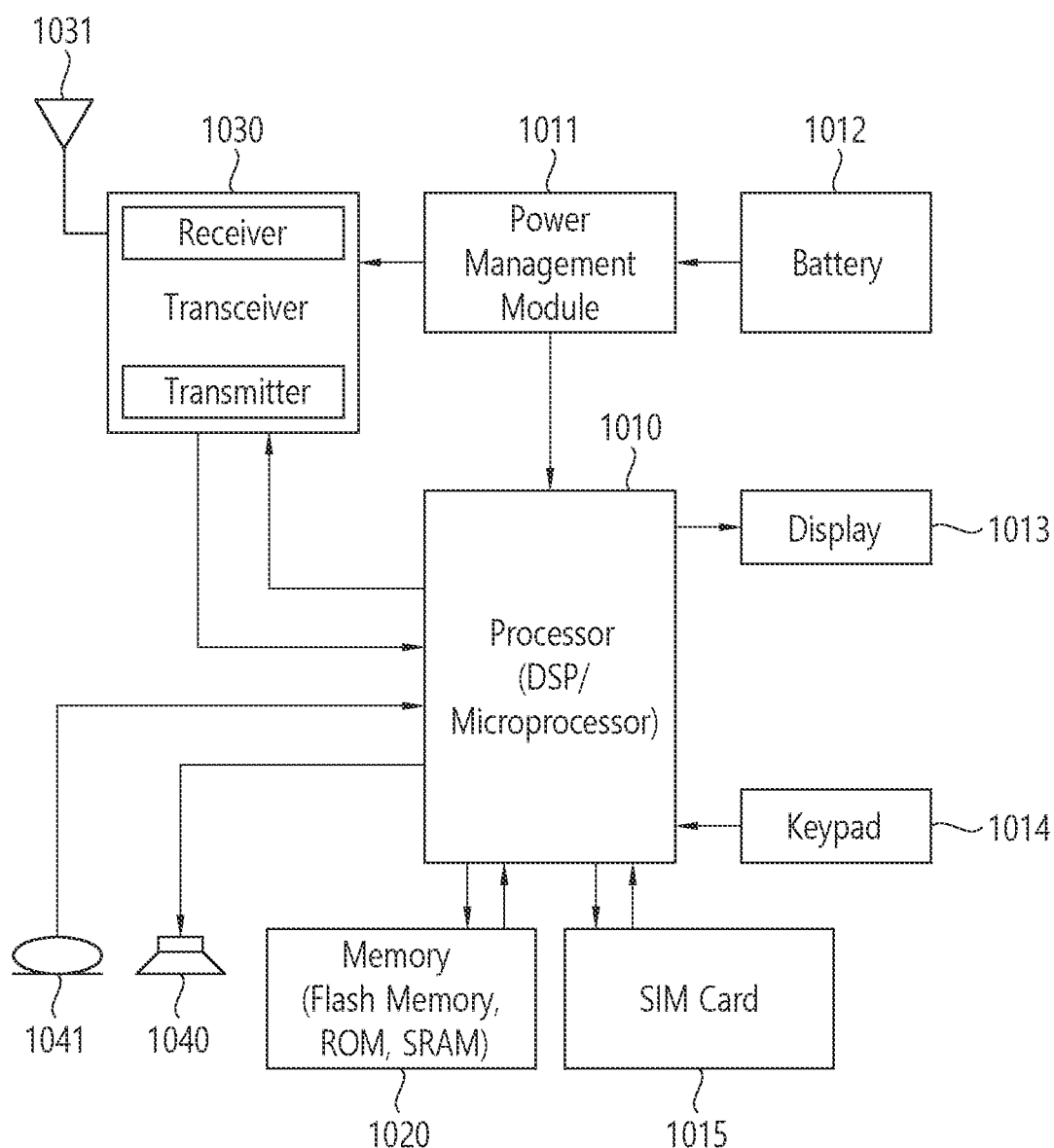
FIG. 10 shows an apparatus to which the technical features of the present disclosure can be applied.

FIG. 10 shows an apparatus to which the technical features of the present disclosure can be applied. The detailed description of the same features as those described above will be simplified or omitted.

An apparatus may be referred to as a wireless device, such as a user equipment (UE), an Integrated Access and Backhaul (IAB), or etc.

A wireless device includes a processor 1010, a power management module 1011, a battery 1012, a display 1013, a keypad 1014, a subscriber identification module (SIM) card 1015, a memory 1020, a transceiver 1030, one or more antennas 1031, a speaker 1040, and a microphone 1041.

The processor 1010 may be configured to implement proposed functions, procedures and/or methods described in this description. Layers of the radio interface protocol may be implemented in the processor 1010. The processor 1010 may include application-specific integrated circuit (ASIC), other chipset, logic circuit and/or data processing device. The processor 1010 may be an application processor (AP). The processor 1010 may include at least one of a digital signal processor (DSP), a central processing unit (CPU), a graphics processing unit (GPU), a modem (modulator and demodulator). An example of the processor 1010 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 1011 manages power for the processor 1010 and/or the transceiver 1030. The battery 1012 supplies power to the power management module 1011. The display 1013 outputs results processed by the processor 1010. The keypad 1014 receives inputs to be used by the processor 1010. The keypad 1014 may be shown on the display 1013. The SIM card 1015 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1020 is operatively coupled with the processor 1010 and stores a variety of information to operate the processor 1010. The memory 1020 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1020 and executed by the processor 1010. The memory 1020 can be implemented within the processor 1010 or external to the processor 1010 in which case those can be communicatively coupled to the processor 1010 via various means as is known in the art.

The transceiver 1030 is operatively coupled with the processor 1010, and transmits and/or receives a radio signal. The transceiver 1030 includes a transmitter and a receiver. The transceiver 1030 may include baseband circuitry to process radio frequency signals. The transceiver 1030 controls the one or more antennas 1031 to transmit and/or receive a radio signal.

The speaker 1040 outputs sound-related results processed by the processor 1010. The microphone 1041 receives sound-related inputs to be used by the processor 1010.

Hereinafter, transport of NAS messages and early data transmission (EDT) are described. The following description of the RRC inactive state will be described by taking LTE-A as an example, but it can be applied to NR without loss of generality. For example, in the following description, eNB may be replaced with NG-RAN node/gNB and/or more generally BS, and MME may be replaced with AMF.

The AS provides reliable in-sequence delivery of NAS messages in a cell. During handover, message loss or duplication of NAS messages can occur.

In E-UTRAN, NAS messages are either concatenated with RRC messages or carried in RRC without concatenation. Upon arrival of concurrent NAS messages for the same UE requiring both concatenation with RRC for the high priority queue and also without concatenation for the lower priority queue, the messages are first queued as necessary to maintain in-sequence delivery.

In DL, when an EPS bearer establishment or release procedure is triggered, or for EDT, the NAS message should normally be concatenated with the associated RRC message. When the EPS bearer is modified and when the modification also depends on a modification of the radio bearer, the NAS message and associated RRC message should normally be concatenated. Concatenation of DL NAS with RRC message is not allowed otherwise. In UL concatenation of NAS messages with RRC message is used only for transferring the initial NAS message during connection setup and for EDT. Initial direct transfer is not used in E-UTRAN and no NAS message is concatenated with RRC connection request.

Multiple NAS messages can be sent in a single DL RRC message during EPS bearer establishment or modification. In this case, the order of the NAS messages in the RRC message shall be kept the same as that in the corresponding S1-AP message in order to ensure the in-sequence delivery of NAS messages.

NAS messages are integrity protected and ciphered by PDCP, in addition to the integrity protection and ciphering performed by NAS.

EDT allows one UL data transmission optionally followed by one DL data transmission during the random access procedure.

EDT is triggered when the upper layers have requested the establishment or resumption of the RRC connection for mobile originating (MO) data (i.e. not signaling or short message service (SMS)) and the UL data size is less than or equal to a transport block size (TBS) indicated in the system information. EDT is not used for data over the control plane when using the user plane cellular IoT (CIoT) EPS optimizations.

EDT may be only applicable to bandwidth reduced low complexity (BL) UEs, UEs in enhanced coverage and/or narrowband IoT (NB-IoT) UEs.

Hereinafter, security procedures between UE and EPS access network elements during resuming RRC connection to a new eNB will be described. It may be referred to as Section 7.2.11.3 of 3GPP TS 33.401 V15.7.0 (2019-03).

When the UE decides to resume the RRC connection, the UE sends the RRC Connection Resume Request message on SRB0 and hence it is not integrity protected. The UE shall include information to be used for context identification and re-establishment in the RRC Connection Resume Request message: the Resume ID and a ShortResumeMAC-I. The ShortResumeMAC-I is a message authentication token, which shall be calculated with the following inputs: source C-RNTI, source PCI, resume constant and target Cell-ID as defined by VarShortResumeMAC-Input and using the stored KRRont used with the source eNB where the UE was suspended.

The Resume ID was assigned to the UE in the cell where the UE was suspended (the source cell). The source PCI and source C-RNTI are associated with the cell where the UE was suspended. The target Cell-ID is the identity of the target cell where the UE sends the RRC Connection Resume Request message. The resume constant allows differentiation of VarShortResumeMAC from VarShortMAC. The integrity algorithm shall be the negotiated EIA-algorithm from the stored AS security context from the source eNB.

KEY shall be set to $K_{RRCint}$ of the source cell;
all BEARER bits shall be set to 1;
DIRECTION bit shall be set to 1;
all COUNT bits shall be set to 1.

The ShortResumeMAC-I shall be the 16 least significant bits of the output of the used integrity algorithm.

The target eNB extracts the Resume ID and ShortResumeMAC-I from the RRC Connection Resume Request. The target eNB contacts the source eNB based on the information in the Resume ID by sending a Retrieve UE Context Request message on X2 interface including the Resume ID, the ShortResumeMAC-I and Cell-ID of target cell, in order to retrieve the UE context including the AS security context.

The source eNB retrieves the stored UE context including the AS security context from its database identified by the Resume ID and the source eNB calculates and verifies the ShortResumeMAC-I (calculating it in the same way as described above). If the check of the ShortResumeMAC-I is successful, then the source eNB shall derive a new $K_{eNB}*$ based on the target PCI and target EARFCN-DL. The source eNB can obtain the target PCI and target EARFCN-DL from a cell configuration database by means of the target Cell-ID. If the source eNB has a fresh {NH, NCC} pair from the MME then that pair shall be used and the fresh NH shall be used as in the new $K_{eNB}*$ derivation. The source eNB responds with a Retrieve UE Context Response message to the target eNB on X2 interface including the UE context including the AS security context. The AS security context sent to the target eNB shall include the new derived $K_{eNB}*$, the NCC associated to the $K_{eNB}*$, the UE EPS security capabilities including the security algorithms supported by the UE and ciphering and integrity algorithms used in the source cell. The target eNB shall check if it supports the ciphering and integrity algorithms used in the source cell. If this is not the case, the target eNB shall send an appropriate error message to the UE. If the check is successful the target eNB derives new AS keys (RRC integrity key, RRC encryption key and UP keys) corresponding to the algorithms from the received $K_{eNB}*$, reset all PDCP COUNTs to 0 and activates the new keys in PDCP layer. The target eNB responds with a RRC Connection Resume message including the NCC received from source eNB to the UE on SRB1, integrity protected in PDCP layer using the new AS keys. The RRC Connection Resume message may include RRC connection reconfiguration parameters.

When the UE receives the RRC Connection Resume message, then the UE shall check if the received NCC value is different from the current NCC value stored in the UE itself. If the NCC values differ then the UE needs to synchronize its locally kept NH. The UE then calculates a new $K_{eNB}*$ from either the new NH (if a new NCC value was received) or the current $K_{eNB}*$, using the target cell's PCI and its frequency EARFCN-DL in the target cell. The UE performs then further derivation of the AS keys (RRC integrity key, RRC encryption key and UP keys) from the new derived $K_{eNB}*$. The UE checks the integrity of the RRC Connection Resume message by verifying the MAC-I. If the verification of the MAC-I is successful, then the UE resets all PDCP COUNTs to 0 and activates the new AS keys in PDCP layer and then sends the RRC Connection Resume Complete message both integrity protected and ciphered to the target eNB on SRB1.

Security is fully resumed on UE side after reception and processing of RRC connection resume message. The UE can receive data on DRB(s) after having received and processed RRC connection resume message. UL data on DRB(s) can be sent after RRC Connection Resume Complete message.

After a successful resume the target eNB shall perform Path Switch procedure as is done in case of X2-handover.

When EDT feature is used, the following handling shall apply to the RRC Connection Resume procedure. For protection of the UL EDT data in the RRC Connection Resume Request message and all other RRC messages following the RRC Connection Resume Request message except RRC Connection Reject, the UE and the target eNB shall derive a new $K_{eNB}*$. This new $K_{eNB}*$ shall be derived using the target PCI, target EARFCN-DL and the $K_{eNB}$/NH based on either a horizontal key derivation or a vertical key derivation according to the NCC value sent to the UE in the RRC Connection Suspend message. The UE and the target eNB shall further derive new AS keys $K_{RRCint}$, $K_{RRCenc}$, and $K_{UPenc}$ from the newly derived $K_{eNB}*$. The UE and the target eNB shall use the newly derived $K_{UPenc}$ for ciphering/deciphering of the UL EDT data in PDCP layer in the RRC Connection Resume Request message, and user DL data (if included) in PDCP layer in the RRC Connection Suspend or RRC Connection Resume message. The calculation and verification of the ShortResumeMAC-I shall use the (old) $K_{RRCint}$ used in the source cell.

In addition, a new input parameter for the calculation and verification of ShortResumeMAC-I is needed to protect the UP data transmitted during the resume procedure, i.e. HASH of uplink PDCP data PDU. The UE shall calculate $HASH_{UE\text{-}data}$ with uplink PDCP Data PDU. The UE shall calculate shortResumeMAC-I with source C-RNTI, source PCI, resume constant, target Cell-ID, and $HASH_{UE\text{-}data}$. The target eNB shall calculate $HASH_{eNB\text{-}data}$ with uplink PDCP Data PDU received from the UE, and shall include the $HASH_{eNB\text{-}data}$ in the Retrieve UE Context Request message to the source eNB. The source eNB shall verify the ShortResumeMAC-I with the source C_RNTI, source PCI, resume constant, target Cell-ID and $HASH_{eNB\text{-}data}$.

Since $HASH_{UE\text{-}data}$ is input of ShortResumeMAC-I, the $HASH_{UE\text{-}data}$ is integrity protected, thus, the input of $HASH_{UE\text{-}data}$, i.e. uplink PDCP Data PDU is integrity protected too.

An application cannot assume that all its data will be sent over EDT and hence be integrity protected.

Further, in case of EDT, the RRC Connection Resume message sent by the target eNB to the UE shall be both integrity protected and ciphered in PDCP layer using the new AS keys ($K_{RRCint}$, $K_{RRCenc}$) derived from the new $K_{eNB}*$. In this case, the UE shall ignore the NCC value in RRC Connection Resume message and shall not change its $K_{eNB}$. The UE may receive an RRC Connection Reject message with suspend indication, instead of RRC Connection Resume message. In that case, for the next resume to any target eNB, the UE shall start with the same AS security context as it had when it was suspended originally, i.e., same $K_{eNB}$/NH shall act as base key for derivation of new $K_{eNB}*$.

Hereinafter, the inputs of non-keyed hash calculations using the Key Derivation Function (KDF) will be described.

When the MME and UE shall derive $HASH_{MME}$ and $HASH_{UE}$ respectively using the following parameters as input to the KDF.

S=Unprotected ATTACH Request or TAU Request message,

The order of packing the input, S, to hash algorithm is the same as the order of packing the UL NAS message to the MME.

Key=256-bit string of all 0s $HASH_{MME}$ or $HASH_{UE}$ are the 64 least significant bits of the 256 bits of the KDF output.

The UE and the target eNB shall derive $HASH_{UE\text{-}data}$ and $HASH_{eNB\text{-}data}$, respectively, using the following parameters as input to the KDF.

S=uplink PDCP Data PDU,

Key=256-bit string of all 0s $HASH_{UE\text{-}data}$ or $HASH_{eNB\text{-}data}$ are the full output of the KDF, which is of 256 bits.

For describing the present disclosure more clearly, details of the NH and NCC are described. It may be referred to as Section 3.1 and 6.9.2 of 3GPP TS 33.501 V15.5.0 (2019-06).

5G AS security context for 3GPP access includes the cryptographic keys at AS level with their identifiers, the Next Hop parameter (NH), the Next Hop Chaining Counter parameter (NCC) used for next hop access key derivation, the identifiers of the selected AS level cryptographic algorithms, the UE security capabilities, and the UP Security Policy at the network side, UP security activation status and the counters used for replay protection. In particular, NH and NCC need to be stored also at the AMF during connected mode.

Whenever an initial AS security context needs to be established between UE and gNB/ng-eNB, AMF and the UE shall derive a $K_{gNB}$ and a Next Hop parameter (NH). The $K_{gNB}$ and the NH are derived from the $K_{AMF}$. A NH Chaining Counter (NCC) is associated with each $K_{gNB}$ and NH parameter. Every $K_{gNB}$ is associated with the NCC corresponding to the NH value from which it was derived. At initial setup, the $K_{gNB}$ is derived directly from $K_{AMF}$, and is then considered to be associated with a virtual NH parameter with NCC value equal to zero. At initial setup, the derived NH value is associated with the NCC value one.

If the RRC Resume procedure for UP CIoT 5GS optimization is similar to the one for the UP CIoT EPS optimization, when the UE accesses to the NG-RAN to resume the RRC connection without the EDT, the NG-RAN can deliver the new fresh NCC value to the UE by using the RRC Resume message. However, when the UE requests to trigger the EDT for the UL data (i.e., the UE intends to transmit the UL data whose size is relatively small without transiting to RRC-CONNECTED), there is a critical security problem between the UE and the NG-RAN. This is because the UE uses the latest NCC value sent in the RRC Release message for EDT. While the UE ciphers the UL EDT data by using the UP key $K_{UPenc,\ Existing}$ based on existing unused {$NH_{Existing}$, $NCC_{Existing}$} pair, the NG-RAN tries to decipher the UL EDT data by $K_{UPenc,\ New}$ from the new fresh {$NH_{New}$, $NCC_{New}$} pair. Therefore, the NG-RAN fails to decipher the UL EDT data for the UE.

As described above, the EDT UP integrity protection mechanism is introduced to protect the UP data transmitted during the resume procedure, for example, HASH of uplink PDCP Data PDU. The UE may calculate $HASH_{DATA}$ with uplink PDCP Data PDU. The UE may calculate shortResumeMAC-I with source C-RNTI, source PCI, resume constant, target Cell-ID, and $HASH_{DATA}$. The target eNB may calculate $HASH_{DATA}$ with uplink PDCP Data PDU received from the UE, and may include the $HASH_{DATA}$ in the X2AP RETRIEVE UE CONTEXT REQUEST message to the source eNB. The source eNB may verify the ShortResumeMAC-I with the source C_RNTI, source PCI, resume constant, target Cell-ID and $HASH_{DATA}$.

However, the current solution does not consider the CU-DU split in the eNB or gNB. Basically, the function on calculation of the $HASH_{DATA}$ is hosted in the eNB-CU or gNB-CU(-CP). In order for the eNB-CU or gNB-CU(-CP) to calculate the $HASH_{DATA}$, the uplink PDCP Data PDU is needed as a input. Although the eNB-DU or gNB-DU receives the uplink PDCP Data PDU, there is no W1/F1 connection between the DU and CU. To setup the W1/F1 connection, the eNB-CU or gNB-CU(-CP) may restore the UE context and re-establish the AS security. However, since there is still no $HASH_{DATA}$ in the eNB-CU or gNB-CU(-CP), it is difficult to verify the UE identity and restore the UE context. Therefore, studies for supporting UP security for MO-EDT in CU-DU split will be needed. In particular, studies for calculating the $HASH_{DATA}$ in CU-DU split will be needed.

Hereinafter, some embodiments of methods for supporting UP security for MO-EDT in CU-DU split in a wireless communication system according to the present disclosure will be described. It is to be understood by those skilled in the art that the present disclosure includes combinations or variations of the following embodiments.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 11:
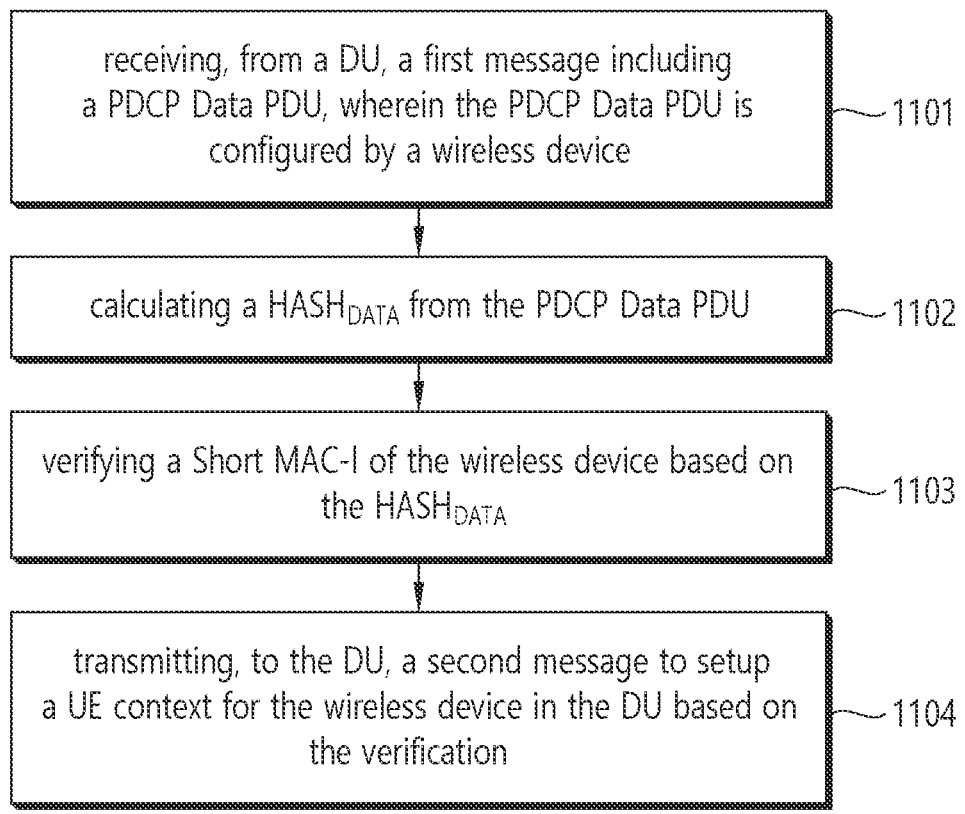
FIG. 11 shows an example of a method for supporting UP security for MO-EDT in CU-DU split in a wireless communication system according to some embodiments of the present disclosure.

FIG. 11 shows an example of a method for supporting UP security for MO-EDT in CU-DU split in a wireless communication system according to some embodiments of the present disclosure. In particular, FIG. 11 shows an example of a method performed by a central unit (CU) in a wireless communication system.

In step 1101, the CU may receive, from a distributed unit (DU), a first message including a PDCP Data PDU. The PDCP Data PDU may be configured by a wireless device. For example, the first message may include a Resume ID or an inactive radio network temporary identity (I-RNTI) of the wireless device.

In step 1102, the CU may calculate a $HASH_{DATA}$ from the PDCP Data PDU. For example, the CU may use a Key Derivation Function (KDF). The $HASH_{DATA}$ may be an output of the KDF, when the PDCP Data PDU is at least one of inputs of the KDF.

In step 1103, the CU may verify a Short MAC-I of the wireless device based on the $HASH_{DATA}$.

For example, the Short MAC-I is verified based on a UE context for the Resume ID or the I-RNTI. The UE context for the Resume ID or the I-RNTI may include at least one of a source cell radio network temporary identity (C_RNTI), source physical cell identity (PCI), resume constant, and/or target Cell-ID. That is, the CU may verify a Short MAC-I of the wireless device based on the $HASH_{DATA}$, source C_RNTI, source PCI, resume constant, and/or target Cell-ID.

According to some embodiments of the present disclosure, the CU may trigger Retrieve UE Context procedure with the $HASH_{DATA}$, based on that the CU does not have the UE context for the Resume ID or the I-RNTI.

In step 1104, the CU may transmit, to the DU, a second message to setup a UE context for the wireless device in the DU based on the verification.

According to some embodiments of the present disclosure, the CU may be an eNB-CU and the DU may be an eNB-DU. In this case, the first message may be a W1AP INITIAL UL RRC MESSAGE TRANSFER message. The second message may be a W1AP UE CONTEXT SETUP REQUEST message.

According to some embodiments of the present disclosure, the CU may be a gNB-CU and the DU may be a gNB-DU. In this case, the first message may be a F1AP INITIAL UL RRC MESSAGE TRANSFER message. The second message may be a F1AP UE CONTEXT SETUP REQUEST message.

Hereinafter, an example of a method for supporting UP security for MO-EDT in CU-DU split in a wireless communication system, according to some embodiments of the present disclosure, will be described. In this example, the method may be performed by a central unit (CU)-control plane (CP) in a wireless communication system. In this example, the CU-CP may be a gNB-CU-CP, the CU-user plane (UP) may be a gNB-CU-UP, and the DU may be a gNB-DU.

The CU-CP may receive, from a distributed unit (DU), a first message including a PDCP Data PDU, wherein the PDCP Data PDU is configured by a wireless device. For example, the first message may include a Resume ID or an inactive radio network temporary identity (I-RNTI) of the wireless device. The first message may be a F1AP INITIAL UL RRC MESSAGE TRANSFER message.

The CU-CP may calculate a $HASH_{DATA}$ from the PDCP Data PDU. For example, the CU-CP may use a Key Derivation Function (KDF). The $HASH_{DATA}$ may be an output of the KDF, when the PDCP Data PDU is at least one of inputs of the KDF.

The CU-CP may verify a Short MAC-I of the wireless device based on the $HASH_{DATA}$.

For example, the Short MAC-I is verified based on a UE context for the Resume ID or the I-RNTI. The UE context for the Resume ID or the I-RNTI may include at least one of a source cell radio network temporary identity (C_RNTI), source physical cell identity (PCI), resume constant, and/or target Cell-ID. That is, the CU may verify a Short MAC-I of the wireless device based on the $HASH_{DATA}$, source C_RNTI, source PCI, resume constant, and/or target Cell-ID.

According to some embodiments of the present disclosure, the CU-CP may trigger Retrieve UE Context procedure with the $HASH_{DATA}$, based on that the CU-CP does not have the UE context for the Resume ID or the I-RNTI.

The CU-CP may transmit, to the DU, a F1AP UE CONTEXT SETUP REQUEST message to setup a UE context for the wireless device in the DU based on the verification. In response to the F1AP UE CONTEXT SETUP REQUEST message, the CU-CP may receive, from the DU, a F1AP CONTEXT SETUP RESPONSE message.

The CU-CP may transmit, to the CU-user plane (UP), a second message including the PDCP Data. For example, the second message may be an E1AP BEARER CONTEXT MODIFICATION REQUEST message.

According to some embodiments of the present disclosure, the CU-CP may transmit, to the CU-user plane (UP), a second message including a downlink (DL) data indication to inform the CU-UP that DL data is pending. In addition, the CU-CP may transmit, to the DU, a UE CONTEXT RELEASE COMMAND message to release a RRC connection with the wireless device. The UE CONTEXT RELEASE COMMAND message may include the DL data indication to inform the DU that the DL data is pending.

Figure 12:
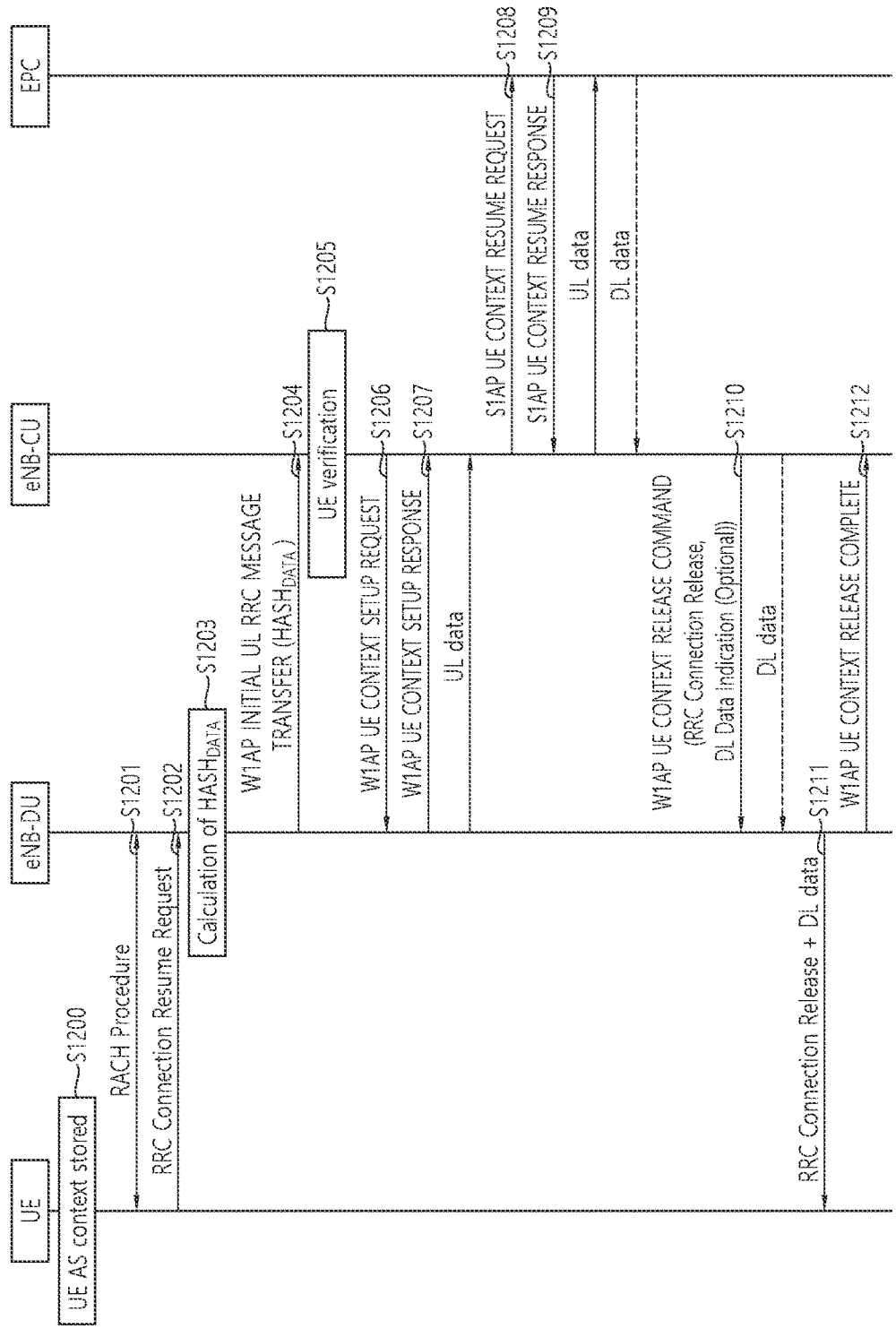
FIG. 12 shows an example of a method for supporting UP security for MO-EDT in CU-DU split in a wireless communication system according to some embodiments of the present disclosure.

FIG. 12 shows an example of a method for supporting UP security for MO-EDT in CU-DU split in a wireless communication system according to some embodiments of the present disclosure. In particular, FIG. 12 shows an example of a method for calculating $HASH_{DATA}$ for MO-EDT by a distributed unit (DU) in a wireless communication system.

In FIG. 12, the DU (for example, eNB-DU or gNB-DU) may calculate $HASH_{DATA}$ of uplink PDCP data PDU. The DU may send the $HASH_{DATA}$ to CU (for example, eNB-CU or the gNB-CU(-CP)) in order to verify the ShortResumeMAC-I received from UE.

In step 1200, the UE may store the AS context. The UE may suspend all SRBs and DRBs. The UE may be in RRC_IDLE with suspend or in RRC_INACTIVE.

In step 1201, at some later point in time (e.g. when the UE is being paged or when new data arrives in the uplink buffer), the UE may decide to resume the connection. The UE may initiate the RACH procedure for UL EDT.

In step 1202, the UE may send an RRC Connection Resume Request message to the eNB to resume the RRC connection. The RRC Connection Resume Request message may include UE's Resume ID (or I-RNTI), the establishment cause, and authentication token. The Resume ID (or I-RNTI) may be used by the eNB to access the stored information required to resume the RRC connection. The authentication token (e.g., Short MAC-I) may be used to allow the eNB to verify the UE identity.

For EDT, the UL data may be transmitted on DTCH multiplexed with this message on CCCH.

In step 1203, the eNB-DU may calculate the $HASH_{DATA}$ with uplink PDCP Data PDU received from the UE.

In step 1204, the eNB-DU may send the W1AP INITIAL UL RRC MESSAGE TRANSFER message including the $HASH_{DATA}$.

In step 1205, the eNB-CU may verify the ShortResume-MAC-I with the source C_RNTI, source PCI, resume constant, target Cell-ID and the $HASH_{DATA}$. If the eNB-CU does not have the UE context for the Resume ID (or I-RNTI), the eNB-CU may trigger the X2 Retrieve UE Context procedure with the $HASH_{DATA}$.

In step 1206, if the UE is verified, the eNB-CU may send to the eNB-DU the W1AP UE CONTEXT SETUP REQUEST message to setup the UE context in the eNB-DU.

In step 1207, the eNB-DU may respond to the eNB-CU with the W1AP UE CONTEXT SETUP RESPONSE message. The UL data may be sent to the eNB-CU.

In step 1208, the eNB-CU may initiate the S1 UE Context Resume procedure to resume the S1 connection and re-activate the S1-U bearers by sending the S1AP UE CONTEXT RESUME REQUEST message. Then, the MME may request the S-GW to re-activate the S1-U bearers for the UE.

In step 1209, the MME may confirm the UE context resumption to the eNB. The UL data may be sent to the S-GW. For example, the EPC may transmit a S1AP UE CONTEXT RESUME RESPONSE to the eNB-CU. If there is a single DL data to the UE, the S-GW may forward the single DL data to the eNB.

In step 1210, if there is a single DL data to the UE, the eNB-CU may send to the eNB-DU the W1AP UE CONTEXT RELEASE COMMAND message including the RRC Connection Release message to release the RRC connection. The UE may be sent back to the RRC_IDLE or RRC_INACTIVE state. The W1AP UE CONTEXT RELEASE COMMAND message may include the DL Data Indication to inform the eNB-DU of pending DL data. The DL data may be sent to the eNB-DU.

In step 1211, if the DL Data Indication is received in step 1210, the eNB-DU may hold on the transmission of the RRC Connection Release message until receiving the DL data from the eNB-CU. When the DL data is received from the eNB-CU, the DL data may be transmitted on DTCH multiplexed with the RRC Connection Release message.

In step 1212, the eNB-DU may confirm the release of the UE-associated logical W1 connection by sending the W1AP UE CONTEXT RELEASE COMPLETE message.

According to some embodiments of the present disclosure, the procedures described with reference to the FIG. 12 may be applied to ng-eNB-DU and ng-eNB-CU connected to 5GC. In addition, this procedure may be also applied to gNB-DU, gNB-CU-CP, and gNB-CU-UP connected to 5GC.

According to some embodiments of the present disclosure, by calculating the $HASH_{DATA}$ in eNB-DU or gNB-DU, additional W1/F1 signalling could be avoided.

In addition, the DU (for example, eNB-DU or gNB-DU) may host the function for calculating the $HASH_{DATA}$.

Figure 13:
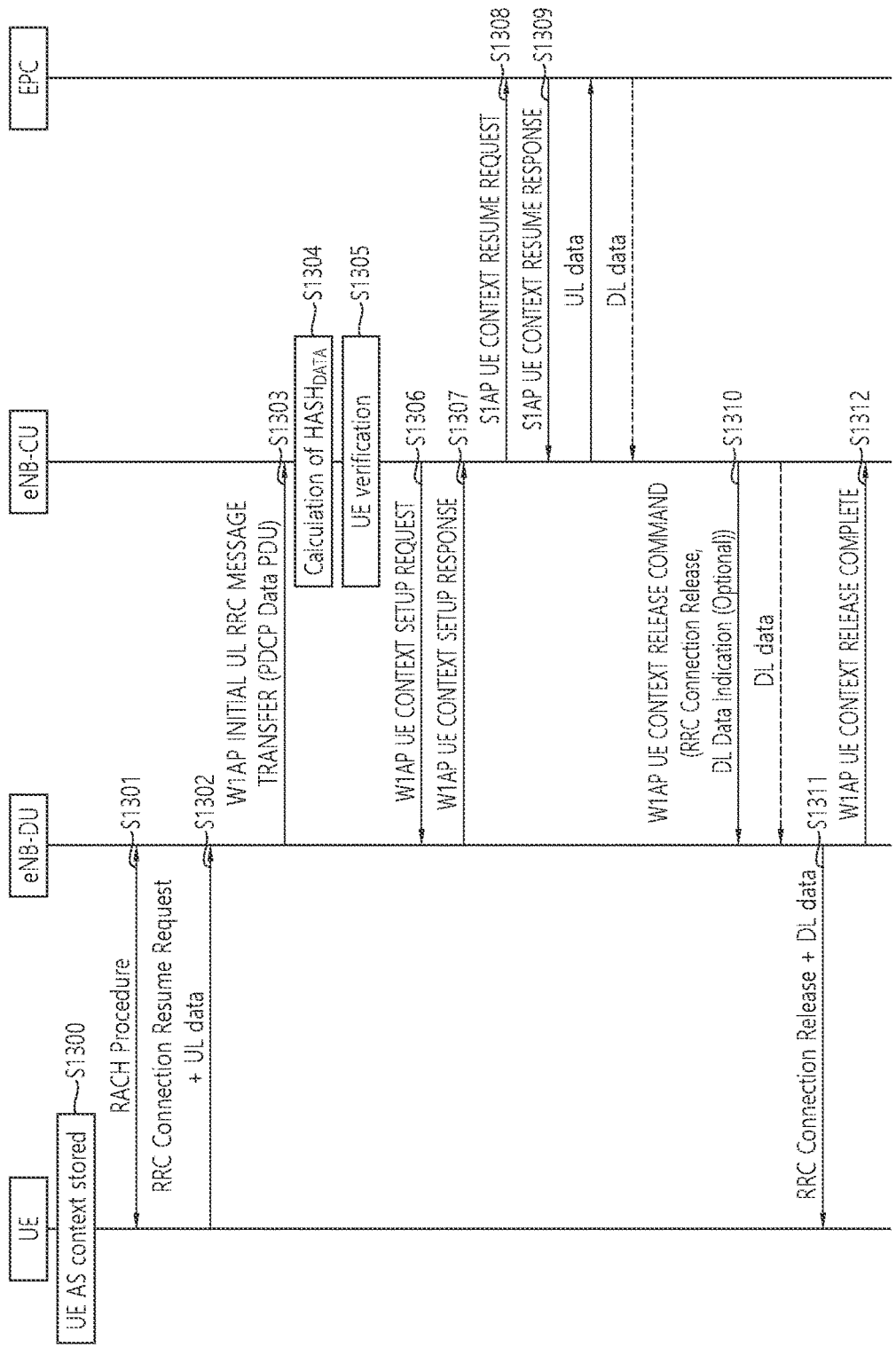
FIGS. 13 to 15 show some examples of method for supporting UP security for MO-EDT in CU-DU split in a wireless communication system according to some embodiments of the present disclosure.
Figure 14:
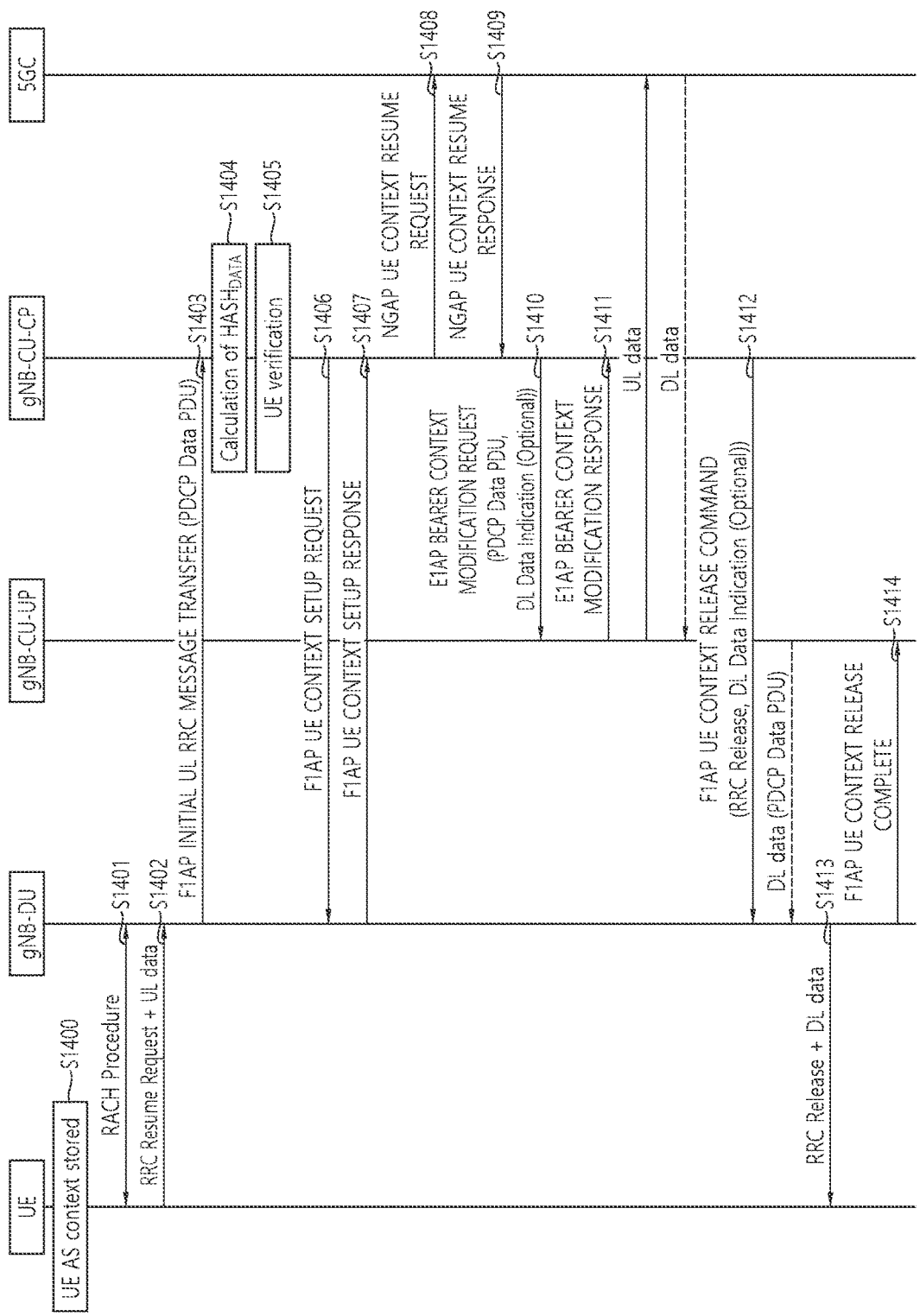
Figure 15:
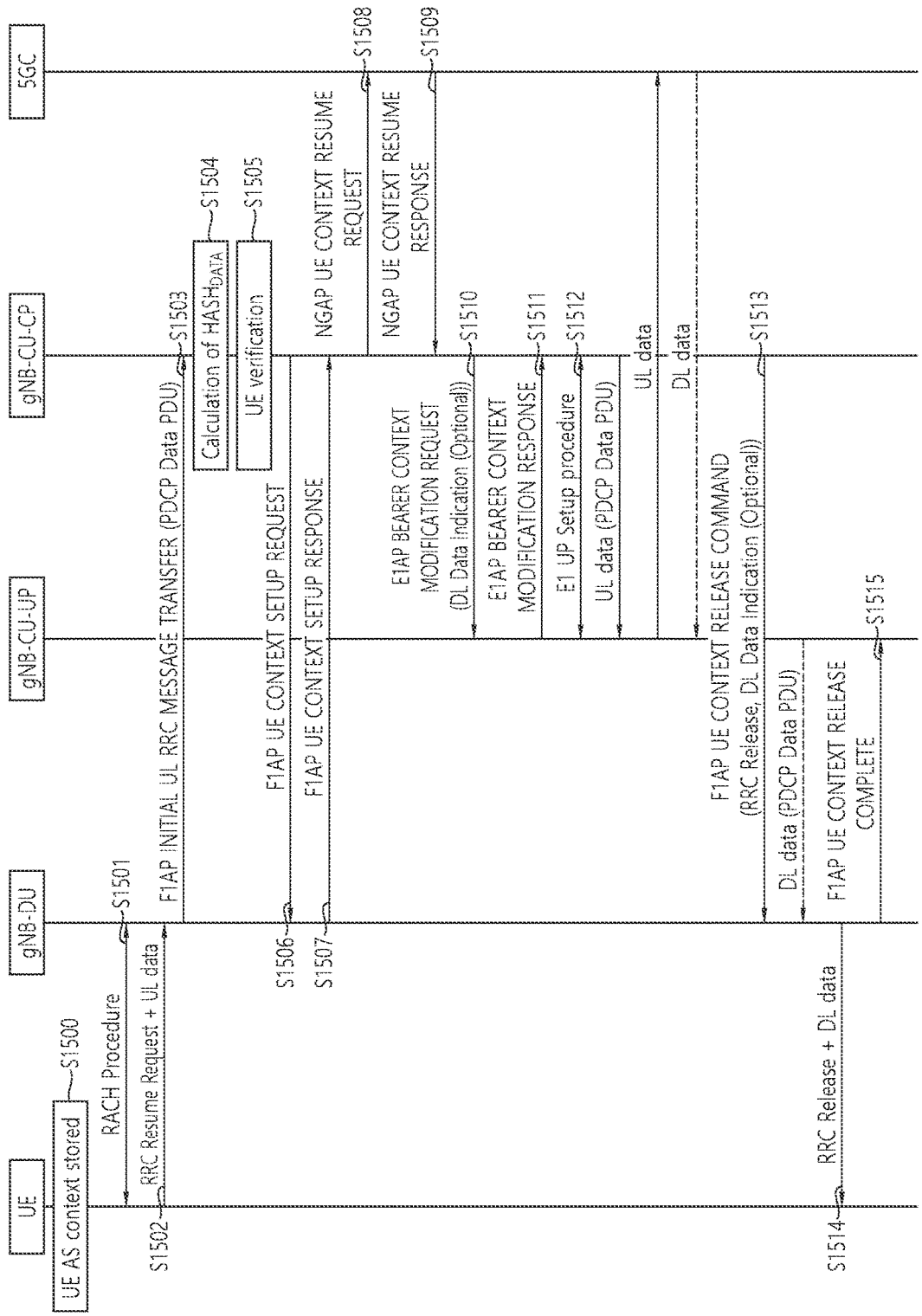

FIGS. 13 to 15 show some examples of method for supporting UP security for MO-EDT in CU-DU split in a wireless communication system according to some embodiments of the present disclosure. In particular, FIGS. 13 to 15 shows some examples of method for calculating $HASH_{DATA}$ for MO-EDT by a central unit (CU) before W1/F1 UE Context Setup procedure.

In FIGS. 13 to 15, the eNB-DU or gNB-DU may forward the PDCP Data PDU to the eNB-CU or the gNB-CU-CP before W1/F1 UE Context Setup procedure. The eNB-CU or gNB-CU-CP may calculate $HASH_{DATA}$ of uplink PDCP data PDU and use the $HASH_{DATA}$ to verify the ShortResume-MAC-I received from UE.

Referring to FIG. 13, an eNB-CU may calculate the $HASH_{DATA}$ before W1 UE Context Setup procedure. In FIG. 13, the Evolved Packet Core (EPC) may include Mobility Management Entity (MME) and a Serving Gateway (S-GW).

In step 1300, the UE may store the AS context. The UE may suspend all SRBs and DRBs. The UE may be in RRC_IDLE with suspend or in RRC_INACTIVE.

In step 1301, at some later point in time (for example, when the UE is being paged or when new data arrives in the uplink buffer) the UE may decide to resume the connection. The UE may initiate the RACH procedure for UL EDT.

In step 1302, The UE may send an RRC Connection Resume Request message to the eNB to resume the RRC connection. The RRC Connection Resume Request message may include UE's Resume ID (or I-RNTI), the establishment cause, and authentication token. The Resume ID (or I-RNTI) may be used by the eNB to access the stored information required to resume the RRC connection. The authentication token (e.g., Short MAC-I) may be used to allow the eNB to verify the UE identity.

For EDT, the UL data may be transmitted on DTCH multiplexed with this message on CCCH.

In step 1303, the eNB-DU may sends the W1AP INITIAL UL RRC MESSAGE TRANSFER message containing the PDCP Data PDU.

In step 1304, the eNB-CU may calculate the $HASH_{DATA}$ with uplink PDCP Data PDU received from the eNB-DU.

In step 1305, the eNB-CU may verify the ShortResume-MAC-I with the source C_RNTI, source PCI, resume constant, target Cell-ID and $HASH_{DATA}$. If the eNB-CU does not have the UE context for the Resume ID (or I-RNTI), the eNB-CU may trigger the X2 Retrieve UE Context procedure with the $HASH_{DATA}$.

In step 1306, if the UE is verified, the eNB-CU may send to the eNB-DU the W1AP UE CONTEXT SETUP REQUEST message to setup the UE context in the eNB-DU.

In step 1307, the eNB-DU may respond to the eNB-CU with the W1AP UE CONTEXT SETUP RESPONSE message.

In step 1308, the eNB-CU may initiate the S1 UE Context Resume procedure to resume the S1 connection and re-activate the S1-U bearers by sending the S1AP UE CONTEXT RESUME REQUEST message. The MME may request the S-GW to re-activate the S1-U bearers for the UE.

In step 1309, the MME may confirm the UE context resumption to the eNB. The UL data may be sent to the S-GW. If there is a single DL data to the UE, the S-GW may forward the single DL data to the eNB. For example, the EPC may transmit a S1AP UE CONTEXT RESUME RESPONSE message to the eNB-CU.

In step 1310, if there is a single DL data to the UE, the eNB-CU may send to the eNB-DU the W1AP UE CONTEXT RELEASE COMMAND message including the RRC Connection Release message to release the RRC connection and send back the UE to the RRC_IDLE or RRC_INACTIVE state. The W1AP UE CONTEXT RELEASE COM- MAND message may also include the DL Data Indication to inform the eNB-DU of pending DL data. The DL data may be sent to the eNB-DU.

In step 1311, if the DL Data Indication is received in step 10, the eNB-DU may hold on the transmission of the RRC Connection Release message until receiving the DL data from the eNB-CU. When the DL data is received from the eNB-CU, the DL data may be transmitted on DTCH multiplexed with the RRC Connection Release message.

In step 1312, the eNB-DU may confirm the release of the UE-associated logical W1 connection by sending the W1AP UE CONTEXT RELEASE COMPLETE message.

Referring to FIG. 14, a gNB-CU-CP may calculate the $HASH_{DATA}$ before F1 UE Context Setup procedure and without E1 UP Setup procedure. In FIG. 14, the 5G core network (5GC) may include an access and mobility management function (AMF) and a user plane function (UPF).

In step 1400, the UE may store the AS context. The UE may suspend all SRBs and DRBs. The UE may be in RRC_IDLE with suspend or in RRC_INACTIVE.

In step 1401, at some later point in time (for example, when the UE is being paged or when new data arrives in the uplink buffer) the UE may decide to resume the connection. The UE may initiate the RACH procedure for UL EDT.

In step 1402, the UE may send an RRC Resume Request message to the gNB to resume the RRC connection. The RRC Resume Request message may include UE's Resume ID (or I-RNTI), the establishment cause, and authentication token. The Resume ID (or I-RNTI) may be used by the gNB to access the stored information required to resume the RRC connection. The authentication token (e.g., Short MAC-I) may be used to allow the gNB to verify the UE identity.

For EDT, the UL data may be transmitted on DTCH multiplexed with this message on CCCH.

In step 1403, the gNB-DU may send the F1AP INITIAL UL RRC MESSAGE TRANSFER message containing the PDCP Data PDU.

In step 1404, the gNB-CU-CP may calculate the $HASH_{DATA}$ with uplink PDCP Data PDU received from the gNB-DU.

In step 1405, the gNB-CU-CP may verify the ShortResumeMAC-I with the source C_RNTI, source PCI, resume constant, target Cell-ID and $HASH_{DATA}$. If the gNB-CU-CP does not have the UE context for the Resume ID (or I-RNTI), the gNB-CU-CP may trigger the Xn Retrieve UE Context procedure with the $HASH_{DATA}$.

In step 1406, if the UE is verified, the gNB-CU-CP may send to the gNB-DU the F1AP UE CONTEXT SETUP REQUEST message to setup the UE context in the gNB-DU.

In step 1407, the gNB-DU may respond to the gNB-CU-CP with the F1AP UE CONTEXT SETUP RESPONSE message.

In step 1408, the gNB-CU-CP may initiate the NG UE Context Resume procedure to resume the NG connection and re-activate the NG-U bearers by sending the NGAP UE CONTEXT RESUME REQUEST message. The AMF may request the UPF to re-activate the NG-U bearers for the UE.

In step 1409, the AMF may confirm the UE context resumption to the gNB. For example, the 5GC may transmit a NGAP UE CONTEXT RESUME RESPONSE message to the gNB-CU-CP.

In step 1410, the gNB-CU-CP may initiate the E1 Bearer Context Modification procedure to forward the F1 DL UP TNL Information towards the gNB-DU. For example, the gNB-CU-CP may transmit an E1AP BEARER CONTEXT MODIFICATION REQUEST message including the PDCP Data PDU from the UE. In addition, the E1AP BEARER CONTEXT MODIFICATION REQUEST message may include a DL Data Indication to inform the gNB-CU-UP that the DL data is pending. Based on the DL Data Indication indication, the gNB-CU-UP could wait for the DL data before suspending the UE context and the NG connection and releasing the F1 connection. According to some embodiments of the present disclosure, the DL Data Indication may be included in the E1AP BEARER CONTEXT MODIFICATION REQUEST message, optionally.

In step 1411, the gNB-CU-UP may indicate that the modification of the bearer context was successful by the E1AP BEARER CONTEXT MODIFICATION RESPONSE message. The UL data may be sent to the UPF. If there is a single DL data to the UE, the UPF may forward the single DL data to the gNB-CU-UP.

In step 1412, if there is a single DL data to the UE, the gNB-CU-CP may send to the gNB-DU the F1AP UE CONTEXT RELEASE COMMAND message including the RRC Release message to release the RRC connection and send back the UE to the RRC_IDLE or RRC_INACTIVE state. The F1AP UE CONTEXT RELEASE COMMAND message may include the DL Data Indication. The DL Data indication may inform the gNB-DU that the DL data is pending. The DL data in the form of the PDCP Data PDU may be sent to the gNB-DU.

According to some embodiment of the present disclosure, the DL Data Indication may be sent to the gNB-DU as included in the F1AP UE CONTEXT SETUP REQUEST message of step 1406.

In step 1413, if the DL Data Indication is received in step 1412, the gNB-DU may hold on the transmission of the RRC Release message until receiving the DL data from the gNB-CU-UP. When the DL data is received, the DL data may be transmitted, to the UE, on DTCH multiplexed with the RRC Release message.

In step 1414, the gNB-DU may confirm the release of the UE-associated logical F1 connection by sending the F1AP UE CONTEXT RELEASE COMPLETE message.

Referring to FIG. 15, a gNB-CU-CP may calculate the $HASH_{DATA}$ before F1 UE Context Setup procedure and with E1 UP Setup procedure. In FIG. 15, the 5G core network (5GC) may include an access and mobility management function (AMF) and a user plane function (UPF).

In step 1500, the UE may store the AS context. The UE may suspends all SRBs and DRBs. The UE may be in RRC_IDLE with suspend or in RRC_INACTIVE.

In step 1501, at some later point in time (for example, when the UE is being paged or when new data arrives in the uplink buffer), the UE may decide to resume the connection. The UE may initiate the RACH procedure for UL EDT.

In step 1502, the UE may send an RRC Resume Request message to the gNB to resume the RRC connection. The RRC Resume Request message may include UE's Resume ID (or I-RNTI), the establishment cause, and authentication token. The Resume ID (or I-RNTI) may be used by the gNB to access the stored information required to resume the RRC connection. The authentication token (e.g., Short MAC-I) may be used to allow the gNB to verify the UE identity.

For EDT, the UL data may be transmitted on DTCH multiplexed with this message on CCCH.

In step 1503, the gNB-DU may send the F1AP INITIAL UL RRC MESSAGE TRANSFER message containing the PDCP Data PDU.

In step 1504, the gNB-CU-CP may calculate the $HASH_{DATA}$ with uplink PDCP Data PDU received from the gNB-DU.

In step 1505, the gNB-CU-CP may verify the ShortResumeMAC-I with the source C_RNTI, source PCI, resume constant, target Cell-ID and $HASH_{DATA}$. If the gNB-CU-CP does not have the UE context for the Resume ID (or I-RNTI), the gNB-CU-CP may trigger the Xn Retrieve UE Context procedure with the $HASH_{DATA}$.

In step 1506, if the UE is verified, the gNB-CU-CP may send to the gNB-DU the F1AP UE CONTEXT SETUP REQUEST message to setup the UE context in the gNB-DU.

In step 1507, the gNB-DU may respond to the gNB-CU-CP with the F1AP UE CONTEXT SETUP RESPONSE message.

In step 1508, the gNB-CU-CP may initiate the NG UE Context Resume procedure to resume the NG connection and re-activate the NG-U bearers by sending the NGAP UE CONTEXT RESUME REQUEST message. The AMF may request the UPF to re-activate the NG-U bearers for the UE.

In step 1509, the AMF may confirm the UE context resumption to the gNB. For example, the 5GC may transmit a NGAP UE CONTEXT RESUME RESPONSE message to the gNB-CU-CP.

In step 1510, the gNB-CU-CP may initiate the E1 Bearer Context Modification procedure to forward the F1 DL UP TNL Information towards the gNB-DU. For example, the gNB-CU-CP may transmit an E1AP BEARER CONTEXT MODIFICATION REQUEST message to the gNB-U-UP including the PDCP Data PDU. The DL Data Indication may be included in the E1AP BEARER CONTEXT MODIFICATION REQUEST message. The DL Data Indication may inform the gNB-CU-UP that the DL data is pending. Based on the DL Data Indication, the gNB-CU-UP could wait for the DL data before suspending the UE context and the NG connection and releasing the F1 connection.

In step 1511, the gNB-CU-UP may indicate that the modification of the bearer context was successful by the E1AP BEARER CONTEXT MODIFICATION RESPONSE message.

In step 1512, the gNB-CU-CP may initiate the E1 UP Setup procedure to forward the UL data to the gNB-CU-UP. The UL data may be sent to the UPF via the gNB-CU-UP. If there is a single DL data to the UE, the UPF may forward the single DL data to the gNB-CU-UP.

In step 1513, if there is a single DL data to the UE, the gNB-CU-CP may send to the gNB-DU the F1AP UE CONTEXT RELEASE COMMAND message including the RRC Release message to release the RRC connection and send back the UE to the RRC_IDLE or RRC_INACTIVE state. The F1AP UE CONTEXT RELEASE COMMAND message may include the DL Data Indication. The DL Data Indication may inform the gNB-DU that the DL data is pending. The DL data, in the form of the PDCP Data PDU, may be sent to the gNB-DU.

According to some embodiments of the present disclosure, the DL Data Indication may be sent to the gNB-DU as included in the F1AP UE CONTEXT SETUP REQUEST message of step 1506.

In step 1514, if the DL Data Indication is received in step 1512, the gNB-DU may hold on the transmission of the RRC Release message until receiving the DL data from the gNB-CU-UP. When the DL data is received, the DL data may be transmitted on DTCH multiplexed with the RRC Release message.

In step 1515, the gNB-DU may confirm the release of the UE-associated logical F1 connection by sending the F1AP UE CONTEXT RELEASE COMPLETE message.

According to some embodiments described with reference to the FIGS. 13 to 15, by calculating the $HASH_{DATA}$ in eNB-CU or gNB-CU(-CP), the function for calculating the $HASH_{DATA}$ could be still handled by the eNB-CU or gNB-CU(-CP).

In addition, it is needed for the eNB-DU or gNB-DU to forward the PDCP Data PDU of the UE to eNB-CU or gNB-CU(-CP) before W1/F1 UE Context Setup procedure.

Figure 16:
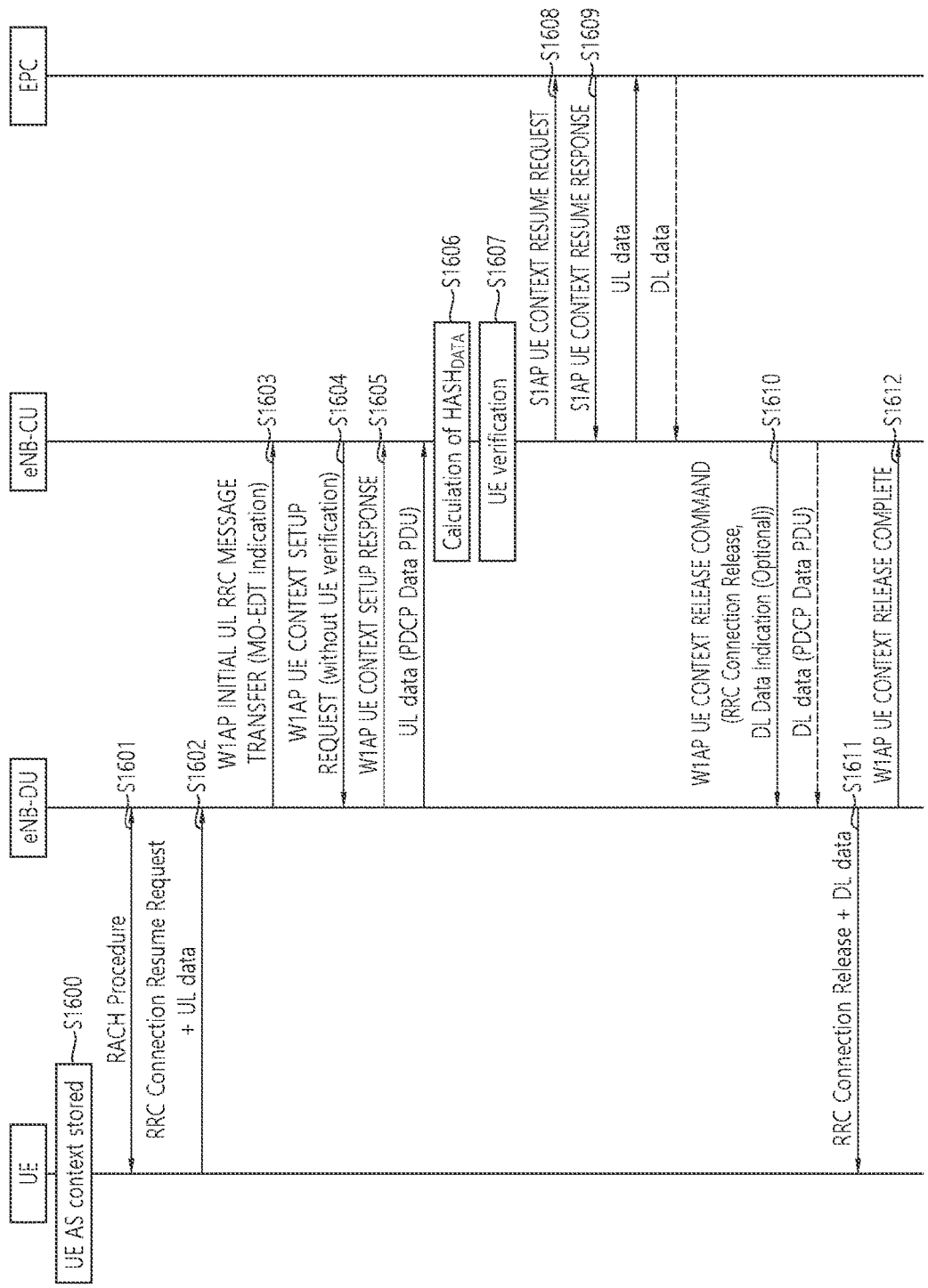
FIGS. 16 to 17 show some examples of method for supporting UP security for MO-EDT in CU-DU split in a wireless communication system according to some embodiments of the present disclosure.
Figure 17:
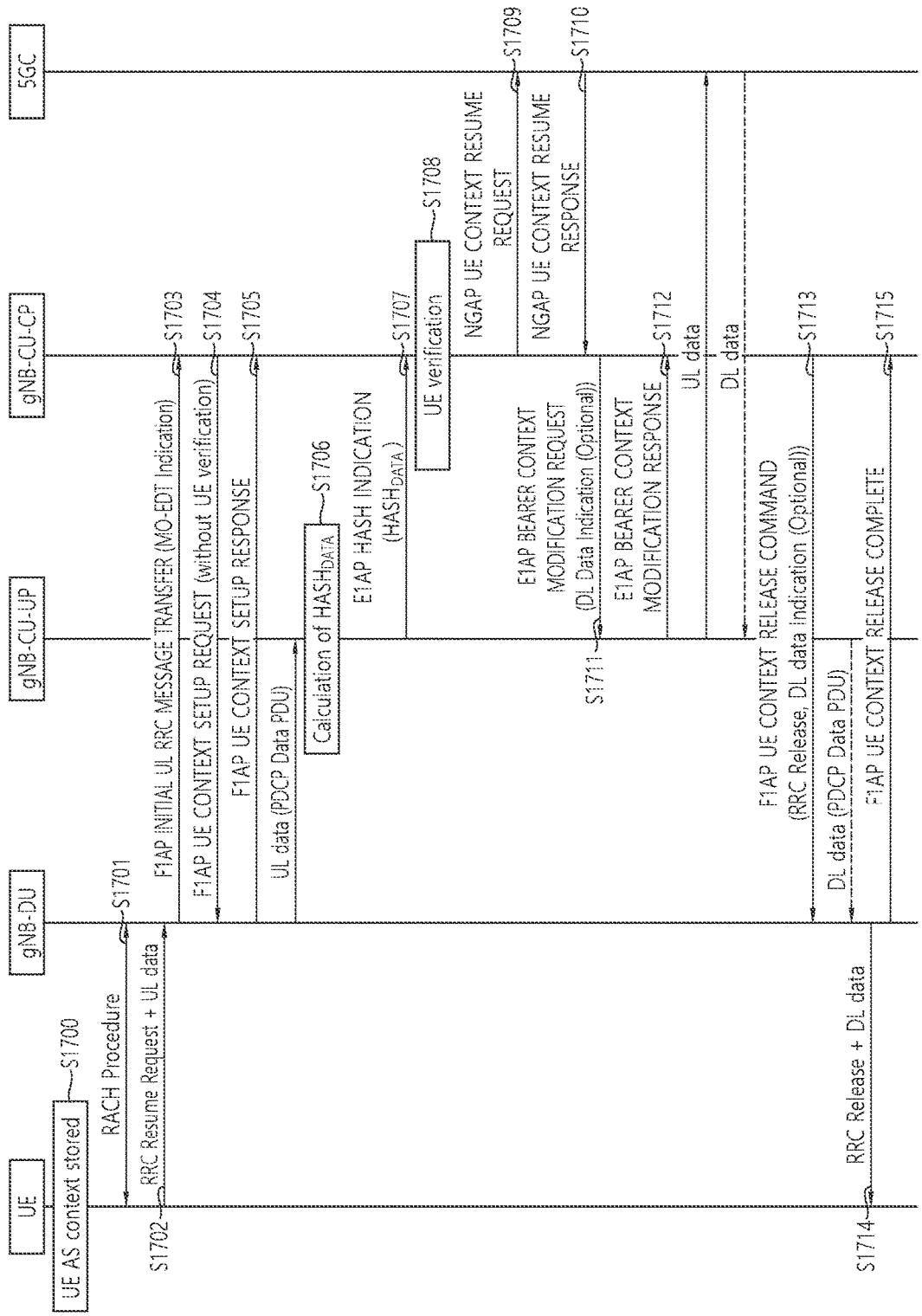

FIGS. 16 to 17 show some examples of method for supporting UP security for MO-EDT in CU-DU split in a wireless communication system according to some embodiments of the present disclosure. In particular, FIGS. 16 to 17 show some examples of method for calculating $HASH_{DATA}$ for MO-EDT by a central unit (CU) after W1/F1 UE Context Setup procedure.

In FIGS. 16 to 17, the eNB-DU or gNB-DU may forward the PDCP Data PDU to the eNB-CU or the gNB-CU-CP after W1/F1 UE Context Setup procedure. The eNB-CU or gNB-CU-CP may calculate $HASH_{DATA}$ of uplink PDCP data PDU and use the $HASH_{DATA}$ to verify the ShortResumeMAC-I received from UE.

Referring to FIG. 16, an eNB-CU may calculate the $HASH_{DATA}$ after W1 UE Context Setup procedure. In FIG. 16 the Evolved Packet Core (EPC) may include Mobility Management Entity (MME) and a Serving Gateway (S-GW).

In step 1600, the UE may store the AS context. The UE may suspends all SRBs and DRBs. The UE may be in RRC_IDLE with suspend or in RRC_INACTIVE.

In step 1601, at some later point in time (e.g. when the UE is being paged or when new data arrives in the uplink buffer). The UE may decide to resume the connection. The UE may initiate the RACH procedure for UL EDT.

In step 1602, the UE may send an RRC Connection Resume Request message to the eNB to resume the RRC connection. The RRC Connection Resume Request message may include UE's Resume ID (or I-RNTI), the establishment cause, and authentication token. The Resume ID (or I-RNTI) may be used by the eNB to access the stored information required to resume the RRC connection. The authentication token (e.g., Short MAC-I) may be used to allow the eNB to verify the UE identity.

For EDT, the UL data may be transmitted on DTCH multiplexed with this message on CCCH.

In step 1603, the eNB-DU may send the W1AP INITIAL UL RRC MESSAGE TRANSFER message containing the MO-EDT Indication. The MO-EDT Indication may be used to inform the eNB-CU that the MO-EDT is triggered by the UE.

In step 1604, when the eNB-CU receiving the MO-EDT Indication in step 1603, the eNB-CU may skip the UE verification since the $HASH_{DATA}$ is not calculated yet. The eNB-CU may initiate the W1 UE Context Setup procedure without the UE verification.

In step 1605, the eNB-DU may confirm the setup of a UE context. The UL data, in the form of PDCP Data PDU, may be sent to the eNB-CU.

In step 1606, the eNB-CU may calculate the $HASH_{DATA}$ with uplink PDCP Data PDU received from the eNB-DU.

In step 1607, the eNB-CU may verify the ShortResumeMAC-I with the source C_RNTI, source PCI, resume constant, target Cell-ID and $HASH_{DATA}$. If the eNB-CU does not have the UE context for the Resume ID (or I-RNTI), the eNB-CU may trigger the X2 Retrieve UE Context procedure with the $HASH_{DATA}$.

In step 1608, the eNB-CU may initiate the S1 UE Context Resume procedure to resume the S1 connection and re-activate the S1-U bearers by sending the S1AP UE CON- TEXT RESUME REQUEST message. The MME may request the S-GW to re-activate the S1-U bearers for the UE.

In step 1609, the MME may confirm the UE context resumption to the eNB. The UL data may be sent to the S-GW. If there is a single DL data to the UE, the S-GW may forward the single DL data to the eNB. For example, the EPC may transmit a S1AP UE CONTEXT RESUME RESPONSE message to the eNB-CU.

In step 1610, if there is a single DL data to the UE, the eNB-CU may send to the eNB-DU the W1AP UE CONTEXT RELEASE COMMAND message including the RRC Connection Release message to release the RRC connection and send back the UE to the RRC_IDLE or RRC_INACTIVE state. The W1AP UE CONTEXT RELEASE COMMAND message may include the DL Data Indication. The DL Data Indication may inform the eNB-DU that the DL data is pending. The DL data, in the form of the PDCP Data PDU, may be sent to the eNB-DU.

In step 1611, if the DL Data Indication is received in step 1610, the eNB-DU may hold on the transmission of the RRC Connection Release message until receiving the DL data from the eNB-CU. When the DL data is received from the eNB-CU, the DL data may be transmitted on DTCH multiplexed with the RRC Connection Release message.

In step 1612, the eNB-DU may confirm the release of the UE-associated logical W1 connection by sending the W1AP UE CONTEXT RELEASE COMPLETE message.

According to some embodiment of the present disclosure, the procedure described above with reference to the FIG. 16 could be applied to ng-eNB-DU and ng-eNB-CU connected to 5GC. In addition, this procedure could be applied to gNB-DU, gNB-CU-CP, and gNB-CU-UP connected to 5GC.

Referring to FIG. 17 a gNB-CU-CP may calculate the $HASH_{DATA}$ after F1 UE Context Setup procedure. In FIG. 17 the 5G core network (5GC) may include an access and mobility management function (AMF) and a user plane function (UPF).

In step 1700, the UE may store the AS context. The UE may suspend all SRBs and DRBs. The UE may be in RRC_IDLE with suspend or in RRC_INACTIVE.

In step 1701, at some later point in time (for example, when the UE is being paged or when new data arrives in the uplink buffer) the UE may decide to resume the connection. The UE may initiate the RACH procedure for UL EDT.

In step 1702, the UE may sends an RRC Resume Request message to the gNB to resume the RRC connection. The RRC Resume Request message may include UE's Resume ID (or I-RNTI), the establishment cause, and authentication token. The Resume ID (or I-RNTI) may be used by the gNB to access the stored information required to resume the RRC connection. The authentication token (e.g., Short MAC-I) may be used to allow the gNB to verify the UE identity.

For EDT, the UL data may be transmitted on DTCH multiplexed with this message on CCCH.

In step 1703, the gNB-DU may send, to the gNB-CU-CP, the F1AP INITIAL UL RRC MESSAGE TRANSFER message including the MO-EDT Indication. The MO-EDT Indication may be used to inform the gNB-CU-CP that the MO-EDT is triggered by the UE.

In step 1704, when the gNB-CU-CP receives the MO-EDT Indication in step 1703, the gNB-CU-CP may skip the UE verification since the $HASH_{DATA}$ is not calculated yet. The gNB-CU-CP may initiates the F1 UE Context Setup procedure without the UE verification.

In step 1705, the gNB-DU may confirm the setup of a UE context. The UL data, in the form of PDCP Data PDU, may be sent to the gNB-CU-UP.

In step 1706, the gNB-CU-UP may calculate the $HASH_{DATA}$ with uplink PDCP Data PDU received from the gNB-DU.

In step 1707, the gNB-CU-UP may send the E1AP HASH INDICATION message containing the $HASH_{DATA}$ to the gNB-CU-CP.

In step 1708, the gNB-CU-CP may verify the ShortResumeMAC-I with the source C_RNTI, source PCI, resume constant, target Cell-ID and the $HASH_{DATA}$. If the gNB-CU-CP does not have the UE context for the Resume ID (or I-RNTI), the gNB-CU-CP may trigger the Xn Retrieve UE Context procedure with the $HASH_{DATA}$.

In step 1709, the gNB-CU-CP may initiate the NG UE Context Resume procedure to resume the NG connection and re-activate the NG-U bearers by sending the NGAP UE CONTEXT RESUME REQUEST message. The AMF may request the UPF to re-activate the NG-U bearers for the UE.

In step 1710, the AMF may confirm the UE context resumption to the gNB. For example, the 5GC may transmit NGAP UE CONTEXT RESUME RESPONSE message to the gNB-CU-CP.

In step 1711, the gNB-CU-CP may initiate the E1 Bearer Context Modification procedure to forward the F1 DL UP TNL Information towards the gNB-DU. For example, the gNB-CU-CP may transmit an E1AP BEARER CONTEXT MODIFICATION REQUEST message. The E1AP BEARER CONTEXT MODIFICATION REQUEST message may include the DL Data Indication. The DL Data Indication may inform the gNB-CU-UP that the DL data is pending. Based on this indication, the gNB-CU-UP could wait for the DL data before suspending the UE context and the NG connection and releasing the F1 connection. According to some embodiments of the present disclosure, the DL Data Indication may be optionally included in the E1AP BEARER CONTEXT MODIFICATION REQUEST message.

In step 1712, the gNB-CU-UP may indicate that the modification of the bearer context was successful by sending the E1AP BEARER CONTEXT MODIFICATION RESPONSE message. The UL data may be then sent to the UPF. If there is a single DL data to the UE, the UPF may forward the single DL data to the gNB-CU-UP.

In step 1713, if there is a single DL data to the UE, the gNB-CU-CP may send to the gNB-DU the F1AP UE CONTEXT RELEASE COMMAND message including the RRC Release message to release the RRC connection and send back the UE to the RRC_IDLE or RRC_INACTIVE state. The F1AP UE CONTEXT RELEASE COMMAND message may include the DL Data Indication. The DL Data Indication may inform the gNB-DU that the DL data is pending. The DL data, in the form of the PDCP Data PDU, may be sent to the gNB-DU.

In step 1714, if the DL Data Indication is received in step 13, the gNB-DU holds on the transmission of the RRC Release message until receiving the DL data from the gNB-CU-UP. When the DL data is received, the DL data may be transmitted on DTCH multiplexed with the RRC Release message.

In step 1715, the gNB-DU may confirm the release of the UE-associated logical F1 connection by sending the F1AP UE CONTEXT RELEASE COMPLETE message to the gNB-CU-CP.

According to some embodiments of the present disclosure, by calculating the $HASH_{DATA}$ in eNB-CU or gNB-CU, the function for calculating the $HASH_{DATA}$ could be still handled by the eNB-CU or gNB-CU.

In addition, in order to forward the PDCP Data PDU of the UE to eNB-CU or gNB-CU(-UP), the eNB-CU or gNB-CU(-CP) may request to the eNB-DU or gNB-DU to setup of the UE context without UE verification. Furthermore, if the $HASH_{DATA}$ is calculated by the gNB-CU-UP, a function for calculating the $HASH_{DATA}$ may be hosted in the gNB-CU-UP.

According to some embodiments described with reference to FIGS. 11 to 17, $HASH_{DATA}$ could be calculated by each node (for example, DU, CU-CP, or CU-UP). In addition, it is proposed to deliver a single DL data without state transition to RRC_CONNECTED in CU-DU split case.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

<Robot>

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

<Autonomous-Driving/Self-Driving>

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

<XR>

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner. XR technology can be applied to HMD, head-up display (HUD), mobile phone, tablet PC, laptop, desktop, TV, digital signage. A device to which the XR technology is applied may be referred to as an XR device.

Figure 18:
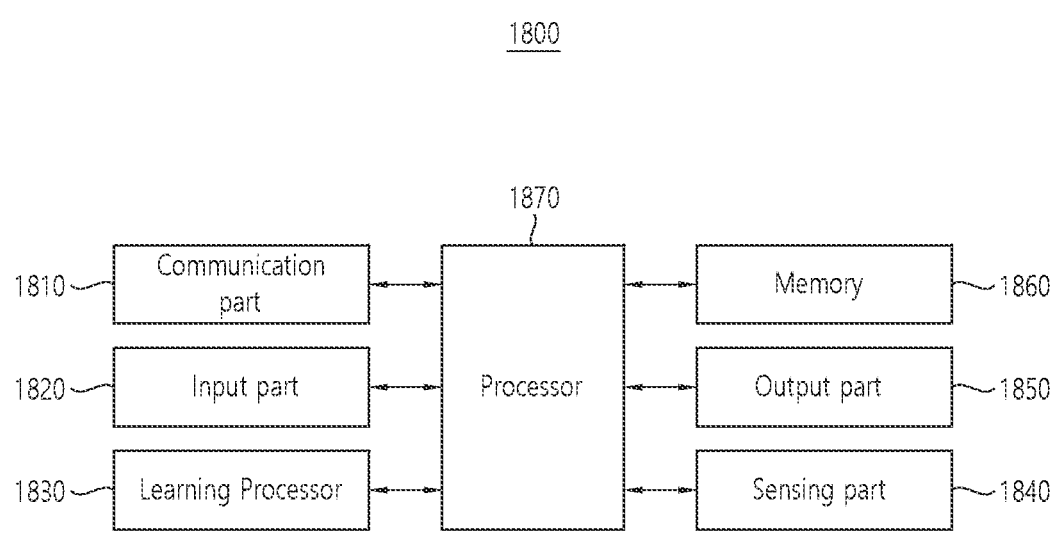
FIG. 18 shows an example of an AI device to which the technical features of the present disclosure can be applied.

FIG. 18 shows an example of an AI device to which the technical features of the present disclosure can be applied.

The AI device 1800 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 18, the AI device 1800 may include a communication part 1810, an input part 1820, a learning processor 1830, a sensing part 1840, an output part 1850, a memory 1860, and a processor 1870.

The communication part 1810 can transmit and/or receive data to and/or from external devices such as the AI devices and the AI server using wire and/or wireless communication technology. For example, the communication part 1810 can transmit and/or receive sensor information, a user input, a learning model, and a control signal with external devices. The communication technology used by the communication part 1810 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1820 can acquire various kinds of data. The input part 1820 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1820 can acquire input data to be used when acquiring an output using learning data and a learning model for model learning. The input part 1820 may obtain raw input data, in which case the processor 1870 or the learning processor 1830 may extract input features by preprocessing the input data.

The learning processor 1830 may learn a model composed of an ANN using learning data. The learned ANN can be referred to as a learning model. The learning model can be used to infer result values for new input data rather than learning data, and the inferred values can be used as a basis for determining which actions to perform. The learning processor 1830 may perform AI processing together with the learning processor of the AI server. The learning processor 1830 may include a memory integrated and/or implemented in the AI device 1800. Alternatively, the learning processor 1830 may be implemented using the memory 1860, an external memory directly coupled to the AI device 1800, and/or a memory maintained in an external device.

The sensing part 1840 may acquire at least one of internal information of the AI device 1800, environment information of the AI device 1800, and/or the user information using various sensors. The sensors included in the sensing part 1840 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1850 may generate an output related to visual, auditory, tactile, etc. The output part 1850 may include a display unit for outputting visual information, a speaker for outputting auditory information, and/or a haptic module for outputting tactile information.

The memory 1860 may store data that supports various functions of the AI device 1800. For example, the memory 1860 may store input data acquired by the input part 1820, learning data, a learning model, a learning history, etc.

The processor 1870 may determine at least one executable operation of the AI device 1800 based on information determined and/or generated using a data analysis algorithm and/or a machine learning algorithm. The processor 1870 may then control the components of the AI device 1800 to perform the determined operation. The processor 1870 may request, retrieve, receive, and/or utilize data in the learning processor 1830 and/or the memory 1860, and may control the components of the AI device 1800 to execute the predicted operation and/or the operation determined to be desirable among the at least one executable operation. The processor 1870 may generate a control signal for controlling the external device, and may transmit the generated control signal to the external device, when the external device needs to be linked to perform the determined operation. The processor 1870 may obtain the intention information for the user input and determine the user's requirements based on the obtained intention information. The processor 1870 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1830 and/or learned by the learning processor of the AI server, and/or learned by their distributed processing. The processor 1870 may collect history information including the operation contents of the AI device 1800 and/or the user's feedback on the operation, etc. The processor 1870 may store the collected history information in the memory 1860 and/or the learning processor 1830, and/or transmit to an external device such as the AI server. The collected history information can be used to update the learning model. The processor 1870 may control at least some of the components of AI device 1800 to drive an application program stored in memory 1860. Furthermore, the processor 1870 may operate two or more of the components included in the AI device 1800 in combination with each other for driving the application program.

Figure 19:
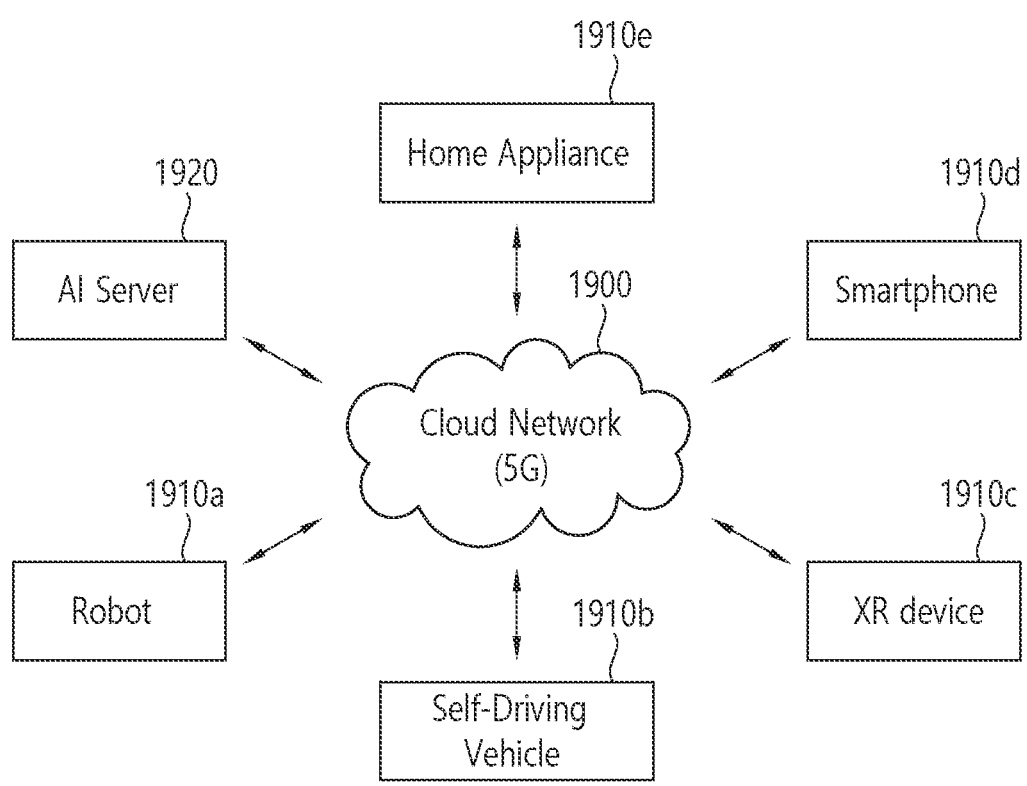
FIG. 19 shows an example of an AI system to which the technical features of the present disclosure can be applied.

FIG. 19 shows an example of an AI system to which the technical features of the present disclosure can be applied.

Referring to FIG. 19, in the AI system, at least one of an AI server 1920, a robot 1910*a*, an autonomous vehicle 1910*b*, an XR device 1910*c*, a smartphone 1910*d* and/or a home appliance 1910*e* is connected to a cloud network 1900. The robot 1910*a*, the autonomous vehicle 1910*b*, the XR device 1910*c*, the smartphone 1910*d*, and/or the home appliance 1910*e* to which the AI technology is applied may be referred to as AI devices 1910*a* to 1910*e*.

The cloud network 1900 may refer to a network that forms part of a cloud computing infrastructure and/or resides in a cloud computing infrastructure. The cloud network 1900 may be configured using a 3G network, a 4G or LTE network, and/or a 5G network. That is, each of the devices 1910*a* to 1910*e* and 1920 consisting the AI system may be connected to each other through the cloud network 1900. In particular, each of the devices 1910*a* to 1910*e* and 1920 may communicate with each other through a base station, but may directly communicate with each other without using a base station.

The AI server 1920 may include a server for performing AI processing and a server for performing operations on big data. The AI server 1920 is connected to at least one or more of AI devices constituting the AI system, i.e. the robot 1910*a*, the autonomous vehicle 1910*b*, the XR device 1910*c*, the smartphone 1910*d* and/or the home appliance 1910*e* through the cloud network 1900, and may assist at least some AI processing of the connected AI devices 1910*a* to 1910*e*. The AI server 1920 can learn the ANN according to the machine learning algorithm on behalf of the AI devices 1910*a* to 1910*e*, and can directly store the learning models and/or transmit them to the AI devices 1910*a* to 1910*e*. The AI server 1920 may receive the input data from the AI devices 1910*a* to 1910*e*, infer the result value with respect to the received input data using the learning model, generate a response and/or a control command based on the inferred result value, and transmit the generated data to the AI devices 1910*a* to 1910*e*. Alternatively, the AI devices 1910*a* to 1910*e* may directly infer result value for the input data using a learning model, and generate a response and/or a control command based on the inferred result value.

Various embodiments of the AI devices 1910*a* to 1910*e* to which the technical features of the present disclosure can be applied will be described. The AI devices 1910*a* to 1910*e* shown in FIG. 19 can be seen as specific embodiments of the AI device 1800 shown in FIG. 18.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a central unit (CU) in a wireless communication system, the method comprising:
   receiving, from a distributed unit (DU), a first message including a Packet Data Convergence Protocol (PDCP) Protocol Data Unit (PDU), wherein the PDCP PDU is configured by a wireless device, and
   wherein the first message includes a Resume identity (ID) or an inactive-radio network temporary identity (I-RNTI) for the wireless device;
   calculating a $HASH_{DATA}$ from the PDCP PDU;
   triggering a Retrieve UE Context procedure with the $HASH_{DATA}$ based on that the CU does not have a UE context for the Resume ID or the I-RNTI;
   verifying a Short MAC-I of the wireless device based on (i) the $HASH_{DATA}$ and (ii) the UE context for the Resume ID or the I-RNTI; and
   transmitting, to the DU, a second message to setup the UE context for the wireless device in the DU based on the verification.

2. The method of claim 1, wherein the UE context for the Resume ID or the I-RNTI includes at least one of a source cell-radio network temporary identity (C_RNTI), source physical cell identity (PCI), resume constant, and/or target Cell-ID.

3. The method of claim 1, wherein the first message is a W1AP INITIAL UL RRC MESSAGE TRANSFER message.

4. The method of claim 1, wherein the second message is a W1AP UE CONTEXT SETUP REQUEST message.

5. The method of claim 1, wherein the CU is an eNB-CU and the DU is an eNB-DU.

6. The method of claim 1, wherein the first message is a F1AP INITIAL UL RRC MESSAGE TRANSFER message.

7. The method of claim 1, wherein the second message is a F1AP UE CONTEXT SETUP REQUEST message.

8. The method of claim 1, wherein the CU is a gNB-CU and the DU is a gNB-DU.

9. The method of claim 1, wherein the wireless device is in communication with at least one of a mobile device, a network, and/or autonomous vehicles other than the wireless device.

10. A method performed by a central unit (CU)-control plane (CP) in a wireless communication system, the method comprising:
    receiving, from a distributed unit (DU), a first message including a Packet Data Convergence Protocol (PDCP) Protocol Data Unit (PDU), wherein the PDCP PDU is configured by a wireless device, and
    wherein the first message includes a Resume identity (ID) or an inactive-radio network temporary identity (I-RNTI) for the wireless device;
    calculating a $HASH_{DATA}$ from the PDCP PDU;
    triggering a Retrieve UE Context procedure with the $HASH_{DATA}$ based on that the CU does not have a UE context for the Resume ID or the I-RNTI;
    verifying a Short MAC-I of the wireless device based on (i) the $HASH_{DATA}$ and (ii) the UE context for the Resume ID or the I-RNTI; and
    transmitting, to a CU-user plane (UP), a second message including the PDCP PDU.

11. The method of claim 10, wherein the second message is an E1AP BEARER CONTEXT MODIFICATION REQUEST message.

12. The method of claim 10, wherein the second message includes a downlink (DL) data indication,
    wherein the DL data indication informs the CU-UP that DL data is pending.

13. The method of claim 12, wherein the method further comprises:
    transmitting, to the DU, a UE CONTEXT RELEASE COMMAND message to release a RRC connection with the wireless device,
    wherein the UE CONTEXT RELEASE COMMAND message includes the DL data indication to inform the DU that the DL data is pending.

* * * * *